United States Patent
Kim et al.

(10) Patent No.: US 10,484,589 B2
(45) Date of Patent: Nov. 19, 2019

(54) ELECTRONIC DEVICE AND IMAGE CAPTURING METHOD THEREOF

(71) Applicant: SAMSUNG ELECTRONICS CO., LTD., Suwon-si, Gyeonggi-do (KR)

(72) Inventors: Sung Oh Kim, Suwon-si (KR); Dong Hyun Yeom, Bucheon-si (KR); Yong Man Lee, Seongnam-si (KR); Kwang Tai Kim, Suwon-si (KR); Soo Hyung Kim, Hwaseong-si (KR); Hyun Hee Park, Seoul (KR); Ki Huk Lee, Suwon-si (KR); Hyung Ju Chun, Hwaseong-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 34 days.

(21) Appl. No.: 15/636,897

(22) Filed: Jun. 29, 2017

(65) Prior Publication Data
US 2018/0007315 A1   Jan. 4, 2018

(30) Foreign Application Priority Data
Jun. 30, 2016  (KR) .................. 10-2016-0082807

(51) Int. Cl.
*H04N 5/225* (2006.01)
*H04N 5/232* (2006.01)
(Continued)

(52) U.S. Cl.
CPC ........... *H04N 5/2258* (2013.01); *G06F 3/005* (2013.01); *H04N 1/00281* (2013.01);
(Continued)

(58) Field of Classification Search
CPC ............. H04N 5/2258; H04N 5/23222; H04N 5/23238; H04N 5/23254; H04N 5/23258;
(Continued)

(56) References Cited

U.S. PATENT DOCUMENTS 8,072,503 B2   12/2011  Tischer
8,547,443 B2   10/2013  Tischer
(Continued)

FOREIGN PATENT DOCUMENTS

CN    104717481    6/2015
WO    2013/116394  8/2013

OTHER PUBLICATIONS

Extended Search Report dated Dec. 20, 2017 in counterpart European Patent Application No. 17178587.6.
(Continued)

*Primary Examiner* — Daniel M Pasiewicz
(74) *Attorney, Agent, or Firm* — Nixon & Vanderhye P.C.

(57) ABSTRACT

An electronic device includes a first camera supporting a first FOV, a second camera supporting a second FOV, and a processor. The processor is configured to obtain a first image having the first FOV using the first camera, to obtain a second image, which is associated with the first image and has the second FOV using the second camera, to adjust at least one operation attribute of the first camera based on the second image, and to obtain a third image having the first FOV based on the adjusted at least one operation attribute using the first camera.

7 Claims, 15 Drawing Sheets

(51) Int. Cl.
*G06F 3/00* (2006.01)
*H04N 1/00* (2006.01)

(52) U.S. Cl.
CPC ..... *H04N 5/23222* (2013.01); *H04N 5/23238* (2013.01); *H04N 5/23254* (2013.01); *H04N 5/23258* (2013.01); *H04N 5/23267* (2013.01); *H04N 5/23287* (2013.01); *H04N 5/23293* (2013.01); *H04N 5/232933* (2018.08); *H04N 5/232945* (2018.08)

(58) Field of Classification Search
CPC ......... H04N 5/23267; H04N 5/232933; H04N 5/232945; H04N 5/23216
See application file for complete search history.

(56) References Cited

U.S. PATENT DOCUMENTS

| | | | |
|---|---|---|---|
| 8,957,940 | B2 | 2/2015 | Tian |
| 9,080,992 | B2 | 7/2015 | Olsson et al. |
| 9,100,567 | B2 * | 8/2015 | Nagaoka ............... H04N 5/2258 |
| 9,196,039 | B2 | 11/2015 | MacMillan et al. |
| 9,204,041 | B1 | 12/2015 | Campbell |
| 9,262,801 | B2 | 2/2016 | MacMillan et al. |
| 9,330,436 | B2 | 5/2016 | MacMillan et al. |
| 9,369,628 | B2 | 6/2016 | Tian |
| 9,473,713 | B2 | 10/2016 | MacMillan et al. |
| 9,681,068 | B2 | 6/2017 | MacMillan et al. |
| 9,794,498 | B2 | 10/2017 | MacMillan et al. |
| 9,832,397 | B2 | 11/2017 | Macmillan et al. |
| 10,157,315 | B2 | 12/2018 | Nobori et al. |
| 2009/0102946 | A1 | 4/2009 | Tischer |
| 2009/0128647 | A1 * | 5/2009 | Fahn ..................... G01S 3/7865 348/221.1 |
| 2010/0002084 | A1 * | 1/2010 | Hattori ................. G11B 27/034 348/207.1 |
| 2012/0044329 | A1 | 2/2012 | Tischer |
| 2012/0105579 | A1 * | 5/2012 | Jeon ..................... H04N 5/2258 348/38 |
| 2014/0063229 | A1 | 3/2014 | Olsson et al. |
| 2014/0111605 | A1 * | 4/2014 | Guo ....................... G06T 3/4038 348/36 |
| 2014/0253667 | A1 | 9/2014 | Tian |
| 2015/0092066 | A1 * | 4/2015 | Geiss ................... H04N 5/2258 348/180 |
| 2015/0109402 | A1 | 4/2015 | Tian |
| 2015/0172633 | A1 | 6/2015 | Nobori et al. |
| 2015/0179223 | A1 * | 6/2015 | Leppanen ............. G11B 27/034 386/282 |
| 2015/0278988 | A1 | 10/2015 | MacMillan et al. |
| 2015/0279038 | A1 | 10/2015 | MacMillan et al. |
| 2015/0281590 | A1 | 10/2015 | MacMillan et al. |
| 2016/0042493 | A1 | 2/2016 | MacMillan et al. |
| 2016/0050370 | A1 | 2/2016 | Campbell |
| 2016/0112634 | A1 | 4/2016 | MacMillan et al. |
| 2016/0125570 | A1 | 5/2016 | Macmillan et al. |
| 2016/0142629 | A1 * | 5/2016 | Jung ................... H04N 5/23229 348/218.1 |
| 2016/0142655 | A1 | 5/2016 | MacMillan et al. |
| 2017/0013209 | A1 | 1/2017 | Macmillan et al. |
| 2018/0139367 | A1 * | 5/2018 | Chen ................... H04N 5/2258 |
| 2019/0073535 | A1 | 3/2019 | Nobori et al. |

OTHER PUBLICATIONS

Chinese Office Action dated Jul. 29, 2019 for CN Application No. 201710521086.6.

* cited by examiner

<910>

<920>

<930>

<940>

ELECTRONIC DEVICE AND IMAGE CAPTURING METHOD THEREOF

CROSS-REFERENCE TO RELATED APPLICATION

This application is based on and claims priority under 35 U.S.C. § 119 to a Korean patent application filed on Jun. 30, 2016 in the Korean Intellectual Property Office and assigned Serial number 10-2016-0082807, the disclosure of which is incorporated by reference herein in its entirety.

TECHNICAL FIELD

The present disclosure relates generally to a device and a method that capture an image using a plurality of cameras.

BACKGROUND

With the development of electronic technologies, various types of electronic products are being developed and distributed. In particular, a portable electronic device having a variety of functions, such as a smart phone, a tablet personal computer PC, and the like have been increasingly distributed.

In recent years, a user may take a picture in a daily life by using a camera mounted on the portable electronic device such as a smartphone, a tablet PC, or the like. As a result, manufacturers are developing higher performance cameras.

The portable electronic device may include a plurality of cameras on a front or rear surface thereof. A user may capture an image by using the plurality of cameras.

SUMMARY

Example aspects of the present disclosure address at least the above-mentioned problems and/or disadvantages and provide at least the advantages described below. Accordingly, an example aspect of the present disclosure is to provide an electronic device capable of capturing an image of improved quality by using a plurality of cameras and an image capturing method of the electronic device.

In accordance with an example aspect of the present disclosure, an electronic device includes a first camera supporting a first FOV, a second camera supporting a second FOV, and a processor. The processor is configured to obtain a first image having the first FOV using the first camera, to obtain a second image, which is associated with the first image and having the second FOV, using the second camera, to adjust at least one operation attribute of the first camera based on the second image, and to obtain a third image having the first FOV based on the adjusted at least one operation attribute using the first camera.

In accordance with an example aspect of the present disclosure, an electronic device includes a first camera configured to capture a first image having a first FOV; a second camera configured to capture a second image, which includes the first image and has a second FOV wider than the first FOV, and a processor. The processor is configured to generate a third image using the first image and the second image, to analyze pixel movement of the second image corresponding to the first image, and to perform first image stabilization on the third image based on the pixel movement.

In accordance with an example aspect of the present disclosure, an electronic device includes a display, a first camera, a second camera, and a processor. The processor is configured to obtain a preliminary image using at least one of the first camera and the second camera, to verify a first attribute value of a first area of the preliminary image, to verify a second attribute value of a second area of the preliminary image, to set a configuration value associated with the first camera to a first configuration value corresponding to the first attribute value and set a configuration value associated with the second camera to a second configuration value corresponding to the second attribute value, and to capture a first image using the first camera based on the first configuration value and to capture a second image using the second camera based on the second configuration value.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and attendant advantages of the present disclosure will be more apparent and readily appreciated from the following detailed description, taken in conjunction with the accompanying drawings, in which like reference numerals refer to like elements, and wherein.

Throughout the drawings, it should be noted that like reference numbers are used to depict the same or similar elements, features, and structures.

DETAILED DESCRIPTION

Figure 1:
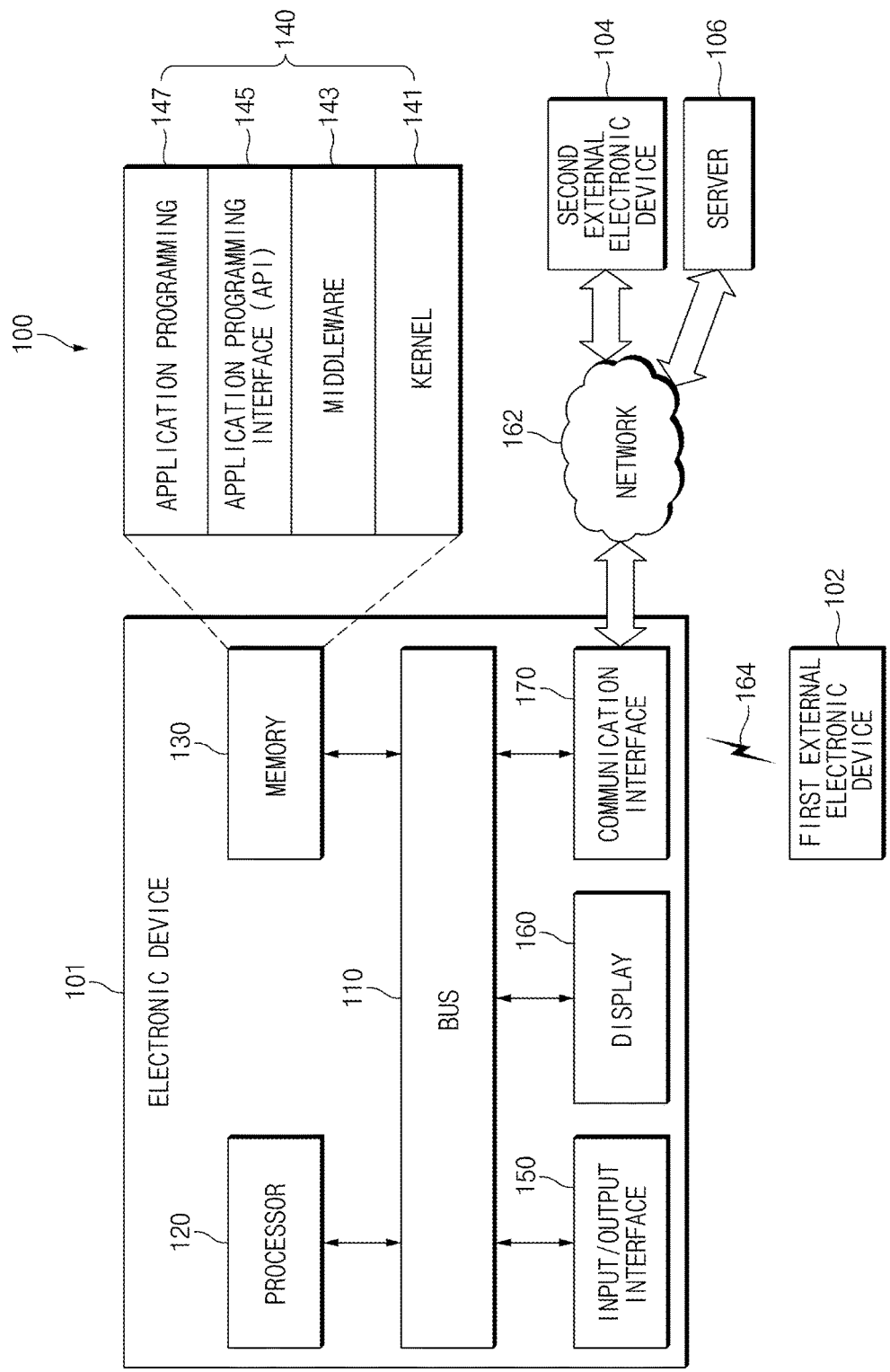
FIG. 1 is a diagram illustrating an example electronic device in a network environment, according to various example embodiments of the present disclosure.

Hereinafter, various example embodiments of the present disclosure are disclosed with reference to the accompanying drawings. However, the present disclosure is not intended to be limited by the various embodiments of the present disclosure to a specific embodiment and it is intended that the present disclosure covers all modifications, equivalents, and/or alternatives of the present disclosure provided they come within the scope of the appended claims and their equivalents. With respect to the descriptions of the accompanying drawings, like reference numerals refer to like elements.

The term "include," "comprise," and "have", or "may include," or "may comprise" and "may have" used herein indicates disclosed functions, operations, or existence of elements but does not exclude other functions, operations or elements.

In the disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used herein may refer to various elements of various embodiments of the present disclosure, but do not limit the elements. For example, "a first user device" and "a second user device" may indicate different user devices regardless of the order or priority thereof. For example, without departing the scope of the present disclosure, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), it may be directly coupled with/to or connected to the other element or an intervening element (e.g., a third element) may be present. On the other hand, when an element (e.g., a first element) is referred to as being "directly coupled with/to" or "directly connected to" another element (e.g., a second element), it should be understood that there are no intervening element (e.g., a third element).

According to the situation, the expression "configured to" used herein may be used interchangeably with, for example, the expression "suitable for", "having the capacity to", "designed to", "adapted to", "made to", or "capable of". The term "configured to" must not refer only "specifically designed to" in hardware. Instead, the expression "a device configured to" may refer to a situation in which the device is "capable of" operating together with another device or other components. For example, a "processor configured to (or set to) perform A, B, and C" may refer, for example, and without limitation, to a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in the present disclosure are used to describe specified embodiments and are not intended to limit the scope of the present disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the present disclosure. In some cases, even if terms are terms which are defined in the disclosure, they may not be interpreted to exclude embodiments of the present disclosure.

For example, an electronic device according to various embodiments of the present disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices, or the like, but is not limited thereto. According to various embodiments, a wearable device may include at least one of an accessory type of a device (e.g., a timepiece, a ring, a bracelet, an anklet, a necklace, glasses, a contact lens, or a head-mounted-device (HMD)), one-piece fabric or clothes type of a device (e.g., electronic clothes), a body-attached type of a device (e.g., a skin pad or a tattoo), or a bio-implantable type of a device (e.g., implantable circuit), or the like, but is not limited thereto.

In some various embodiments of the present disclosure, an electronic device may be a home appliance. The smart home appliance may include at least one of, for example, a television (TV), a digital versatile disc (DVD) player, an audio, a refrigerator, an air conditioner, a cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ or PlayStation™), an electronic dictionary, an electronic key, a camcorder, or an electronic picture frame, or the like, but is not limited thereto.

In various embodiments, the electronic devices may include at least one of various medical devices (e.g., various portable medical measurement devices (e.g., blood glucose meters, heart rate meters, blood pressure meters, or thermometers, and the like), a magnetic resonance angiography (MRA), a magnetic resonance imaging (MRI), a computed tomography (CT), scanners, or ultrasonic devices, and the like), navigation devices, global navigation satellite system (GNSS), event data recorders (EDRs), flight data recorders (FDRs), vehicle infotainment devices, electronic equipment for vessels (e.g., navigation systems, gyrocompasses, and the like), avionics, security devices, head units for vehicles, industrial or home robots, automatic teller's machines (ATMs), points of sales (POSs), or internet of things (e.g., light bulbs, various sensors, electric or gas meters, sprinkler devices, fire alarms, thermostats, street lamps, toasters, exercise equipment, hot water tanks, heaters, boilers, and the like), or the like, but are not limited thereto.

According to various embodiments, the electronic devices may include at least one of parts of furniture or buildings/structures, electronic boards, electronic signature receiving devices, projectors, or various measuring instruments (e.g., water meters, electricity meters, gas meters, or wave meters, and the like), or the like, but are not limited thereto. The electronic devices according to various embodiments of the present disclosure may be one or more combinations of the above-mentioned devices. The electronic devices according to various embodiments of the present disclosure may be flexible electronic devices. Also, electronic devices according to various embodiments of the present disclosure are not limited to the above-mentioned devices, and may include new electronic devices according to technology development Hereinafter, an electronic device according to various embodiments of the present disclosure will be described in greater detail with reference to the accompanying drawings. The term "user" used herein may refer to a person who uses an electronic device or may refer to a device (e.g., an artificial intelligence electronic device) that uses an electronic device.

FIG. 1 is a diagram illustrating an example electronic device in a network environment according to an example embodiment of the present disclosure.

An electronic device 101 in a network environment 100 according to various embodiments of the present disclosure will be described with reference to FIG. 1. The electronic device 101 may include a bus 110, a processor (e.g., including processing circuitry) 120, a memory 130, an input/output interface (e.g., including input/output circuitry) 150, a display 160, and a communication interface (e.g., including communication circuitry) 170. In various embodiments of the present disclosure, at least one of the foregoing elements may be omitted or another element may be added to the electronic device 101.

The bus 110 may include a circuit for connecting the above-mentioned elements 110 to 170 to each other and transferring communications (e.g., control messages and/or data) among the above-mentioned elements.

The processor 120 may include various processing circuitry, such as, for example, and without limitation, at least one of a dedicated processor, a central processing unit (CPU), an application processor (AP), or a communication processor (CP). The processor 120 may perform data processing or an operation related to communication and/or control of at least one of the other elements of the electronic device 101.

The memory 130 may include a volatile memory and/or a nonvolatile memory. The memory 130 may store instructions or data related to at least one of the other elements of the electronic device 101. According to an embodiment of the present disclosure, the memory 130 may store software and/or a program 140. The program 140 may include, for example, a kernel 141, a middleware 143, an application programming interface (API) 145, and/or an application program (or an application) 147. At least a portion of the kernel 141, the middleware 143, or the API 145 may be referred to as an operating system (OS).

The kernel 141 may control or manage system resources (e.g., the bus 110, the processor 120, the memory 130, or the like) used to perform operations or functions of other programs (e.g., the middleware 143, the API 145, or the application program 147). Furthermore, the kernel 141 may provide an interface for allowing the middleware 143, the API 145, or the application program 147 to access individual elements of the electronic device 101 in order to control or manage the system resources.

The middleware 143 may serve as an intermediary so that the API 145 or the application program 147 communicates and exchanges data with the kernel 141.

Furthermore, the middleware 143 may handle one or more task requests received from the application program 147 according to a priority order. For example, the middleware 143 may assign at least one application program 147 a priority for using the system resources (e.g., the bus 110, the processor 120, the memory 130, or the like) of the electronic device 101. For example, the middleware 143 may handle the one or more task requests according to the priority assigned to the at least one application, thereby performing scheduling or load balancing with respect to the one or more task requests.

The API 145, which is an interface for allowing the application 147 to control a function provided by the kernel 141 or the middleware 143, may include, for example, at least one interface or function (e.g., instructions) for file control, window control, image processing, character control, or the like.

The input/output interface 150 may include various input/output circuitry and serve to transfer an instruction or data input from a user or another external device to (an)other element(s) of the electronic device 101. Furthermore, the input/output interface 150 may output instructions or data received from (an)other element(s) of the electronic device 101 to the user or another external device.

The display 160 may include, for example, a liquid crystal display (LCD), a light-emitting diode (LED) display, an organic light-emitting diode (OLED) display, a microelectromechanical systems (MEMS) display, or an electronic paper display, or the like, but is not limited thereto. The display 160 may present various content (e.g., a text, an image, a video, an icon, a symbol, or the like) to the user. The display 160 may include a touch screen, and may receive a touch, gesture, proximity or hovering input from an electronic pen or a part of a body of the user.

The communication interface 170 may include various communication circuitry and set communications between the electronic device 101 and an external device (e.g., a first external electronic device 102, a second external electronic device 104, or a server 106). For example, the communication interface 170 may be connected to a network 162 via wireless communications or wired communications so as to communicate with the external device (e.g., the second external electronic device 104 or the server 106). Additionally, the communication interface 170 may establish a short-range wireless communication connection 164 with, for example, and without limitation, a first external electronic device 102.

The wireless communications may employ at least one of cellular communication protocols such as long-term evolution (LTE), LTE-advance (LTE-A), code division multiple access (CDMA), wideband CDMA (WCDMA), universal mobile telecommunications system (UMTS), wireless broadband (WiBro), or global system for mobile communications (GSM). The wireless communications may include, for example, a short-range communications 164. The short-range communications may include at least one of wireless fidelity (Wi-Fi), Bluetooth, Bluetooth low energy (BLE), Zigbee, near field communication (NFC), magnetic secure transmission (MST), or GNSS. The GNSS may include, for example, at least one of global positioning system (GPS), global navigation satellite system (GLONASS), BeiDou navigation satellite system (BeiDou), or Galileo, the European global satellite-based navigation system according to a use area or a bandwidth. Hereinafter, the term "GPS" and the term "GNSS" may be interchangeably used.

The wired communications may include at least one of universal serial bus (USB), high definition multimedia interface (HDMI), recommended standard 232 (RS-232), plain old telephone service (POTS), or the like. The network 162 may include at least one of telecommunications networks, for example, a computer network (e.g., local area network (LAN) or wide area network (WAN)), the Internet, or a telephone network.

The types of the first external electronic device 102 and the second external electronic device 104 may be the same as or different from the type of the electronic device 101. According to an embodiment of the present disclosure, the server 106 may include a group of one or more servers. A portion or all of operations performed in the electronic device 101 may be performed in one or more other electronic devices (e.g., the first electronic device 102, the second external electronic device 104, or the server 106). When the electronic device 101 should perform a certain function or service automatically or in response to a request, the electronic device 101 may request at least a portion of functions related to the function or service from another device (e.g., the first electronic device 102, the second external electronic device 104, or the server 106) instead of or in addition to performing the function or service for itself. The other electronic device (e.g., the first electronic device 102, the second external electronic device 104, or the server 106) may perform the requested function or additional function, and may transfer a result of the performance to the electronic device 101. The electronic device 101 may use a received result itself or additionally process the received result to provide the requested function or service. To this end, for example, a cloud computing technology, a distributed computing technology, or a client-server computing technology may be used.

Figure 2:
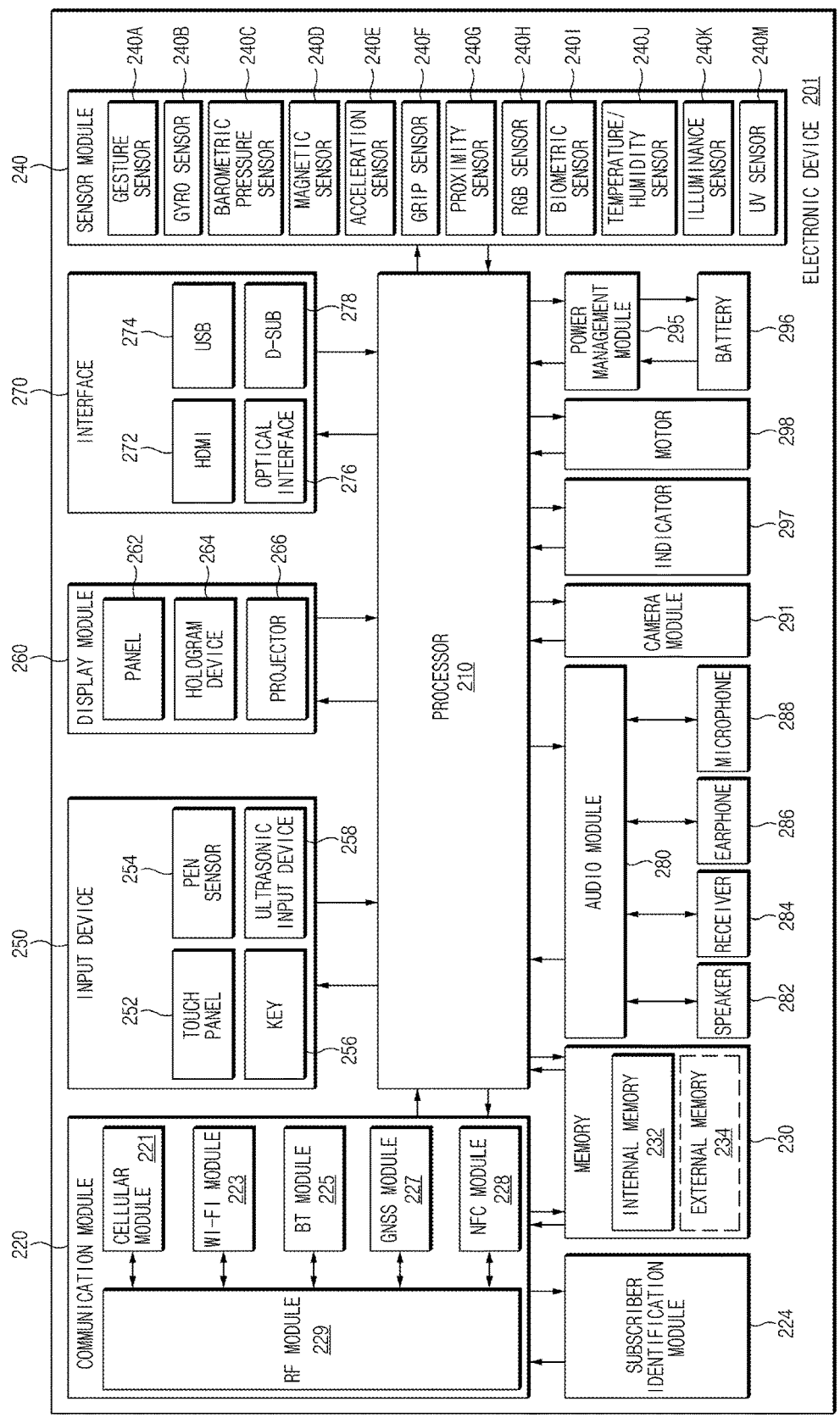
FIG. 2 is a block diagram illustrating an example electronic device, according to various example embodiments of the present disclosure.

FIG. 2 is a block diagram illustrating an example electronic device according to an example embodiment of the present disclosure.

Referring to FIG. 2, an electronic device 201 may include, for example, a part or the entirety of the electronic device 101 illustrated in FIG. 1. The electronic device 201 may include at least one processor (e.g., AP) (e.g., including processing circuitry) 210, a communication module (e.g., including communication circuitry) 220, a subscriber identification module (SIM) 224, a memory 230, a sensor module 240, an input device (e.g., including input circuitry) 250, a display 260, an interface (e.g., including interface circuitry) 270, an audio module 280, a camera module 291, a power management module 295, a battery 296, an indicator 297, and a motor 298.

The processor 210 may include various processing circuitry and run an operating system or an application program so as to control a plurality of hardware or software elements connected to the processor 210, and may process various data and perform operations. The processor 210 may be implemented with, for example, a system on chip (SoC). According to an embodiment of the present disclosure, the processor 210 may further include a graphic processing unit (GPU) and/or an image signal processor. The processor 210 may include at least a portion (e.g., a cellular module 221) of the elements illustrated in FIG. 2. The processor 210 may load, on a volatile memory, an instruction or data received from at least one of other elements (e.g., a nonvolatile memory) to process the instruction or data, and may store various data in a nonvolatile memory.

The communication module 220 may have a configuration that is the same as or similar to that of the communication interface 170 of FIG. 1. The communication module 220 may include various communication circuitry, such as, for example, and without limitation, a cellular module 221, a Wi-Fi module 223, a Bluetooth module 225, a GNSS module 227 (e.g., a GPS module, a GLONASS module, a BeiDou module, or a Galileo module), an NFC module 228 and a radio frequency (RF) module 229.

The cellular module 221 may provide, for example, a voice call service, a video call service, a text message service, or an Internet service through a communication network. The cellular module 221 may identify and authenticate the electronic device 201 in the communication network using the subscriber identification module 224 (e.g., a SIM card). The cellular module 221 may perform at least a part of functions that may be provided by the processor 210. The cellular module 221 may include a communication processor (CP).

Each of the Wi-Fi module 223, the Bluetooth module 225, the GNSS module 225 and the NFC module 228 may include, for example, a processor for processing data transmitted/received through the modules. According to some various embodiments of the present disclosure, at least a part (e.g., two or more) of the cellular module 221, the Wi-Fi module 223, the Bluetooth module 225, the GNSS module 227 and the NFC module 228 may be included in a single integrated chip (IC) or IC package.

The RF module 229 may transmit/receive, for example, communication signals (e.g., RF signals). The RF module 229 may include, for example, a transceiver, a power amp module (PAM), a frequency filter, a low noise amplifier (LNA), an antenna, or the like. According to another embodiment of the present disclosure, at least one of the cellular module 221, the Wi-Fi module 223, the Bluetooth module 225, the GNSS module 227 and the NFC module 228 may transmit/receive RF signals through a separate RF module.

The SIM 224 may include, for example, an embedded SIM and/or a card containing the subscriber identity module, and may include unique identification information (e.g., an integrated circuit card identifier (ICCID)) or subscriber information (e.g., international mobile subscriber identity (IMSI)).

The memory 230 (e.g., the memory 130) may include, for example, an internal memory 232 and/or an external memory 234. The internal memory 232 may include at least one of a volatile memory (e.g., a dynamic RAM (DRAM), a static RAM (SRAM), a synchronous dynamic RAM (SDRAM), or the like), a nonvolatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, a NOR flash memory, or the like)), a hard drive, or a solid state drive (SSD).

The external memory 234 may include a flash drive such as a compact flash (CF), a secure digital (SD), a Micro-SD, a Mini-SD, an extreme digital (xD), a MultiMediaCard (MMC), a memory stick, or the like. The external memory 234 may be operatively and/or physically connected to the electronic device 201 through various interfaces.

A security module 236, which is a module including a storage space that is higher in security level than the memory 230, may be a circuit for securing safe data storage and protected execution circumstances. The security module 236 may be implemented with an additional circuit and may include an additional processor. The security module 236 may be present in an attachable smart chip or SD card, or may include an embedded secure element (eSE), which is installed in a fixed chip. Additionally, the security module 236 may be driven in another OS which is different from the OS of the electronic device 201. For example, the security module 236 may operate based on a java card open platform (JCOP) OS.

The sensor module 240 may, for example, measure physical quantity or detect an operation state of the electronic device 201 so as to convert measured or detected information into an electrical signal. The sensor module 240 may include, for example, at least one of a gesture sensor 240A, a gyro sensor 240B, a barometric pressure sensor 240C, a magnetic sensor 240D, an acceleration sensor 240E, a grip sensor 240F, a proximity sensor 240G, a color sensor 240H (e.g., a red/green/blue (RGB) sensor), a biometric sensor 240I, a temperature/humidity sensor 240J, an illumination (e.g., illuminance) sensor 240K, or an ultraviolet (UV) sensor 240M. Additionally or alternatively, the sensor module 240 may include, for example, an olfactory sensor (E-nose sensor), an electromyography (EMG) sensor, an electroencephalogram (EEG) sensor, an electrocardiogram (ECG) sensor, an infrared (IR) sensor, an iris recognition sensor, and/or a fingerprint sensor. The sensor module 240 may further include a control circuit for controlling at least one sensor included therein. In some various embodiments of the present disclosure, the electronic device 201 may further include a processor configured to control the sensor module 240 as a part of the processor 210 or separately, so that the sensor module 240 is controlled while the processor 210 is in a sleep state.

The input device 250 may include various input circuitry, such as, for example, and without limitation, a touch panel 252, a (digital) pen sensor 254, a key 256, or an ultrasonic input device 258. The touch panel 252 may employ at least one of capacitive, resistive, infrared, and ultraviolet sensing methods. The touch panel 252 may further include a control circuit. The touch panel 252 may further include a tactile layer so as to provide a haptic feedback to a user.

The (digital) pen sensor 254 may include, for example, a sheet for recognition which is a part of a touch panel or is separate. The key 256 may include, for example, a physical button, an optical button, or a keypad. The ultrasonic input device 258 may sense ultrasonic waves generated by an input tool through a microphone 288 so as to identify data corresponding to the ultrasonic waves sensed.

The display 260 (e.g., the display 160) may include a panel 262, a hologram device 264, or a projector 266. The panel 262 may have a configuration that is the same as or similar to that of the display 160 of FIG. 1. The panel 262 may be, for example, flexible, transparent, or wearable. The panel 262 and the touch panel 252 may be integrated into a single module. The hologram device 264 may display a stereoscopic image in a space using a light interference phenomenon. The projector 266 may project light onto a screen so as to display an image. The screen may be disposed in the inside or the outside of the electronic device 201. According to an embodiment of the present disclosure, the display 260 may further include a control circuit for controlling the panel 262, the hologram device 264, or the projector 266.

The interface 270 may include various interface circuitry, such as, for example, and without limitation, an HDMI 272, a USB 274, an optical interface 276, or a D-subminiature (D-sub) 278. The interface 270, for example, may be included in the communication interface 170 illustrated in FIG. 1. Additionally or alternatively, the interface 270 may include, for example, a mobile high-definition link (MHL) interface, an SD card/multi-media card (MMC) interface, or an infrared data association (IrDA) interface.

The audio module 280 may convert, for example, a sound into an electrical signal or vice versa. At least a portion of elements of the audio module 280 may be included in the input/output interface 150 illustrated in FIG. 1. The audio module 280 may process sound information input or output through a speaker 282, a receiver 284, an earphone 286, or the microphone 288.

The camera module 291 is, for example, a device for shooting a still image or a video. According to an embodiment of the present disclosure, the camera module 291 may include at least one image sensor (e.g., a front sensor or a rear sensor), a lens, an image signal processor (ISP), or a flash (e.g., an LED or a xenon lamp).

The power management module 295 may manage power of the electronic device 201. According to an embodiment of the present disclosure, the power management module 295 may include a power management integrated circuit (PMIC), a charger integrated circuit (IC), or a battery or gauge. The PMIC may employ a wired and/or wireless charging method. The wireless charging method may include, for example, a magnetic resonance method, a magnetic induction method, an electromagnetic method, or the like. An additional circuit for wireless charging, such as a coil loop, a resonant circuit, a rectifier, or the like, may be further included. The battery gauge may measure, for example, a remaining capacity of the battery 296 and a voltage, current or temperature thereof while the battery is charged. The battery 296 may include, for example, a rechargeable battery and/or a solar battery.

The indicator 297 may display a specific state of the electronic device 201 or a part thereof (e.g., the processor 210), such as a booting state, a message state, a charging state, or the like. The motor 298 may convert an electrical signal into a mechanical vibration, and may generate a vibration or haptic effect. Although not illustrated, a processing device (e.g., a GPU) for supporting a mobile TV may be included in the electronic device 201. The processing device for supporting a mobile TV may process media data according to the standards of digital multimedia broadcasting (DMB), digital video broadcasting (DVB), Media-FLO™, or the like.

Figure 3:
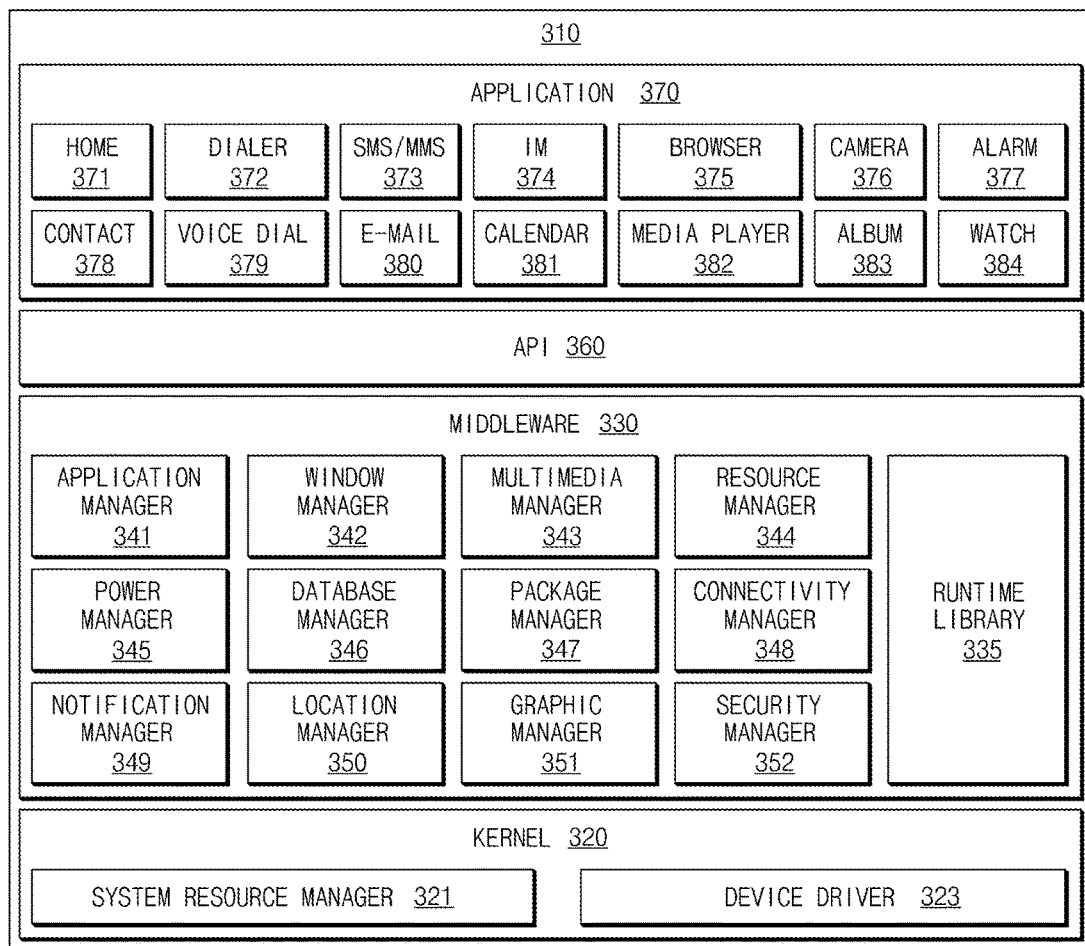
FIG. 3 is a block diagram illustrating an example program module, according to various example embodiments of the present disclosure.

FIG. 3 is a block diagram illustrating an example program module according to an example embodiment of the present disclosure.

Referring to FIG. 3, a program module 310 (e.g., the program 140) may include an operating system (OS) for controlling a resource related to an electronic device (e.g., the electronic device 101) and/or various applications (e.g., the application program 147) running on the OS. The operating system may be, for example, Android, iOS, Windows, Symbian, Tizen, or the like.

The program module 310 may include a kernel 320, a middleware 330, an API 360, and/or an application 370. At least a part of the program module 310 may be preloaded on an electronic device or may be downloaded from an external electronic device (e.g., the first electronic device 102, the second external electronic device 104, or the server 106).

The kernel 320 (e.g., the kernel 141) may include, for example, a system resource manager 321 or a device driver 323. The system resource manager 321 may perform control, allocation, or retrieval of a system resource. According to an embodiment of the present disclosure, the system resource manager 321 may include a process management unit, a memory management unit, a file system management unit, or the like. The device driver 323 may include, for example, a display driver, a camera driver, a Bluetooth driver, a shared memory driver, a USB driver, a keypad driver, a Wi-Fi driver, an audio driver, or an inter-process communication (IPC) driver.

The middleware 330, for example, may provide a function that the applications 370 require in common, or may provide various functions to the applications 370 through the API 360 so that the applications 370 may efficiently use limited system resources in the electronic device. According to an embodiment of the present disclosure, the middleware 330 (e.g., the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351 and a security manager 352.

The runtime library 335 may include, for example, a library module that a complier uses to add a new function through a programming language while the application 370 is running. The runtime library 335 may perform a function for input/output management, memory management, or an arithmetic function.

The application manager 341 may mange, for example, a life cycle of at least one of the applications 370. The window manager 342 may manage a GUI resource used in a screen. The multimedia manager 343 may recognize a format required for playing various media files and may encode or decode a media file using a codec matched to the format. The resource manager 344 may manage a resource such as a source code, a memory, or a storage space of at least one of the applications 370.

The power manager 345, for example, may operate together with a basic input/output system (BIOS) to manage a battery or power and may provide power information required for operating the electronic device. The database manager 346 may generate, search, or modify a database to be used in at least one of the applications 370. The package manager 347 may manage installation or update of an application distributed in a package file format.

The connectivity manger 348 may manage wireless connection of Wi-Fi, Bluetooth, or the like. The notification manager 349 may display or notify an event such as message arrival, appointments, and proximity alerts in such a manner as not to disturb a user. The location manager 350 may manage location information of the electronic device. The graphic manager 351 may manage a graphic effect to be provided to a user or a user interface related thereto. The security manager 352 may provide various security functions required for system security or user authentication. According to an embodiment of the present disclosure, in the case in which an electronic device (e.g., the electronic device 101) includes a phone function, the middleware 330 may further include a telephony manager for managing a voice or video call function of the electronic device.

The middleware 330 may include a middleware module for forming a combination of various functions of the above-mentioned elements. The middleware 330 may provide a module specialized for each type of an operating system to provide differentiated functions. Furthermore, the middleware 330 may delete a part of existing elements or may add new elements dynamically.

The API 360 (e.g., the API 145) which is, for example, a set of API programming functions may be provided in different configurations according to an operating system. For example, in the case of Android or iOS, one API set may be provided for each platform, and, in the case of Tizen, at least two API sets may be provided for each platform.

The application 370 (e.g., the application program 147), for example, may include at least one application capable of performing functions such as a home 371, a dialer 372, an SMS/MMS 373, an instant message (IM) 374, a browser 375, a camera 376, an alarm 377, a contact 378, a voice dial 379, an e-mail 380, a calendar 381, a media player 382, an album 383, a clock (e.g., watch) 384, and although not shown, can include additional applications, such as, for example, and without limitation, health care (e.g., measure an exercise amount or blood sugar), or environmental information provision (e.g., provide air pressure, humidity, or temperature information).

According to an embodiment of the present disclosure, the application 370 may include an information exchange application for supporting information exchange between the electronic device (e.g., the electronic device 101) and an external electronic device (e.g., the first electronic device 102 or the second external electronic device 104). The information exchange application may include, for example, a notification relay application for relaying specific information to the external electronic device or a device management application for managing the external electronic device.

For example, the notification relay application may have a function for relaying, to an external electronic device (e.g., the first electronic device 102 or the second external electronic device 104), notification information generated in another application (e.g., an SMS/MMS application, an e-mail application, a health care application, an environmental information application, or the like) of the electronic device. Furthermore, the notification relay application may receive notification information from the external electronic device and may provide the received notification information to the user.

The device management application, for example, may manage (e.g., install, delete, or update) at least one function (e.g., turn-on/turn off of the external electronic device itself (or some elements) or the brightness (or resolution) adjustment of a display) of the external electronic device (e.g., the first electronic device 102 or the second external electronic device 104) communicating with the electronic device, an application running in the external electronic device, or a service (e.g., a call service, a message service, or the like) provided from the external electronic device.

According to an embodiment of the present disclosure, the application 370 may include a specified application (e.g., a healthcare application of a mobile medical device) according to an attribute of the external electronic device (e.g., the first electronic device 102 or the second external electronic device 104). The application 370 may include an application received from an external electronic device (e.g., the first electronic device 102 or the second external electronic device 104). The application 370 may include a preloaded application or a third-party application downloadable from a server. The names of the elements of the program module 310 illustrated may vary with the type of an operating system.

According to various embodiments of the present disclosure, at least a part of the program module 310 may be implemented with software, firmware, hardware, or a combination thereof. At least a part of the program module 310, for example, may be implemented (e.g., executed) by a processor (e.g., the processor 210). At least a part of the program module 310 may include, for example, a module, a program, a routine, sets of instructions, or a process for performing at least one function.

Figure 4:
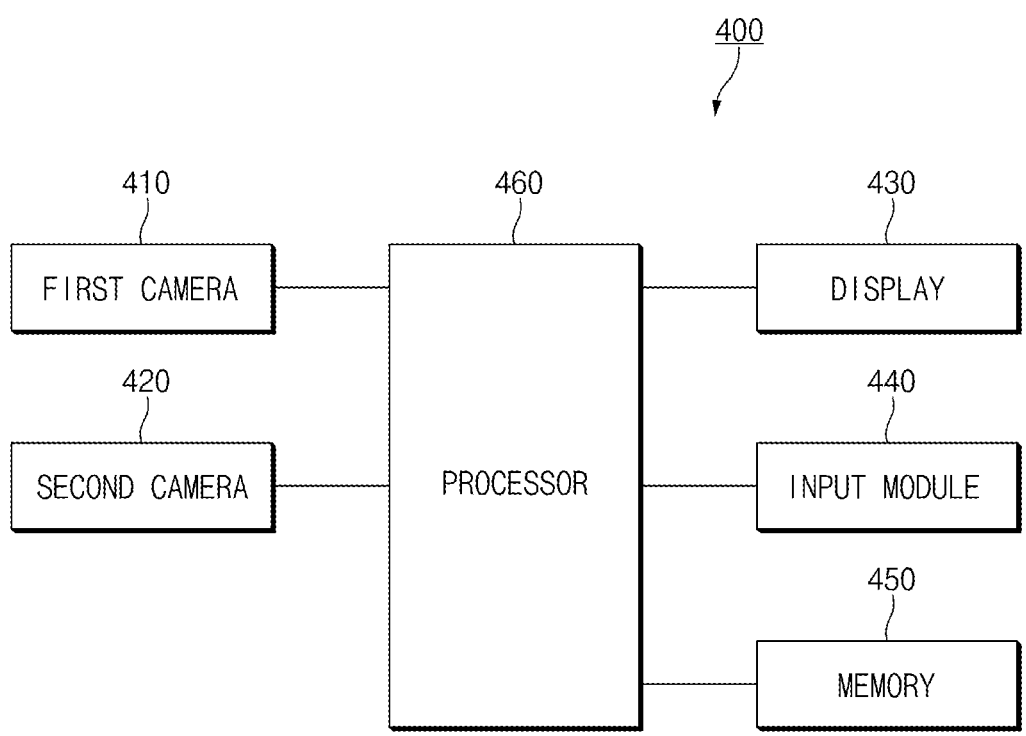
FIG. 4 is a block diagram illustrating an example configuration of an electronic device, according to various example embodiments of the present disclosure.

FIG. 4 is a block diagram illustrating an example configuration of an electronic device, according to various example embodiments of the present disclosure.

Referring to FIG. 4, an electronic device 400 (e.g., the electronic device 200 of FIG. 2) may include a first camera 410, a second camera 420, a display 430, an input module (e.g., including input circuitry) 440, a memory 450, and a processor (e.g., including processing circuitry) 460. According to various embodiments, a part of a configuration of the electronic device 400 illustrated in FIG. 4 may be omitted, or another configuration thereof may be added.

The first camera 410 and the second camera 420 may capture an image (e.g., a picture or a video) that appears through a lens. For example, the first camera 410 and the second camera 420 may capture an image at different time points or at the same time.

According to an embodiment, the first camera 410 and the second camera 420 may be a color camera that captures a color image or a black-white camera that captures a gray scale image. For example, both the first camera 410 and the second camera 420 may be color cameras or black-white cameras. As another example, the first camera 410 may be a black-white camera, and the second camera 420 may be a color camera.

According to an embodiment, the first camera 410 and the second camera 420 may have the same capture direction. According to an embodiment, the first camera 410 and the second camera 420 may have the same field of view (FOV) as each other or different FOVs from each other. For example, the second camera 420 may have a wider FOV than the first camera 410. In the case where the second camera 420 has the wider FOV than the first camera 410, the second camera 420 may capture an image of a wide FOV including an image captured by the first camera 410.

According to an embodiment, each of the first camera 410 and the second camera 420 may include an image sensor. The image sensor may convert light including the subject information received via a lens into an electrical signal. For example, the first camera 410 may include an image sensor supporting a gray scale image of a first FOV, and the second camera 420 may include an image sensor supporting a color image of a second FOV wider than the first FOV.

According to an embodiment, the display 430 may display an image captured by the first camera 410 or the second camera 420 or an image stored in the memory 450. For example, the display 430 may display a preview-image captured by the first camera 410 or the second camera 420. As another example, the display 430 may display an image, which is captured by the first camera 410 or the second camera 420 and is stored in the memory 450 or which is received from another device and is stored in the memory 450.

According to an embodiment, the input module 440 may include various input circuitry configured to receive an input (e.g., a user input). According to an embodiment, the input module 440 may receive a user input for capturing an image or storing the captured image.

According to an embodiment, the display 430 and the input module 440, for example, may be implemented with a touch screen that is capable of displaying and sensing the touch manipulation at the same time. In the touch screen, an input panel may be disposed on the display panel.

According to an embodiment, the memory 450 may store an image captured by the first camera 410 or the second camera 420. For example, the memory 450 may store an image such as a picture, a video, or the like. According to an embodiment, the memory 450 may store a composite image in which an image captured by the first camera 410 and an image captured by the second camera 420 are composed.

According to an embodiment, the processor 460 may include various processing circuitry and control overall operations of the electronic device 400. According to an embodiment, the processor 460 may obtain an image according to various embodiments of the present disclosure by controlling each of the first camera 410, the second camera 420, the display 430, the input module 440, and the memory 450.

According to an embodiment, when capturing an image by using the first camera 410 and the second camera 420, the processor 460 may determine an operation attribute of each of the first camera 410 and the second camera 420 and may capture an image based on the determined operation attribute. For example, the operation attribute may include at least one of an exposure value, a color temperature value, and a shutter speed value. For example, the processor 460 may perform photometry by using the images captured by the first camera 410 and the second camera 420 and may determine exposure values of the first camera 410 and the second camera 420 based on the photometry result.

According to an embodiment, the processor 460 may determine the operation attribute of the first camera 410 based on the image captured by the second camera 420. For example, the processor 460 may perform photometry by using an image of a wide FOV captured by the second camera 420 and may determine the exposure value of the first camera 410 based on the photometry result. As such, the photometry may be also performed on an area that is not included in the image captured by the first camera 410. As such, in the case where the contrast of the image is high, it is possible to reduce the appearance of white holes or black holes.

Figure 5:
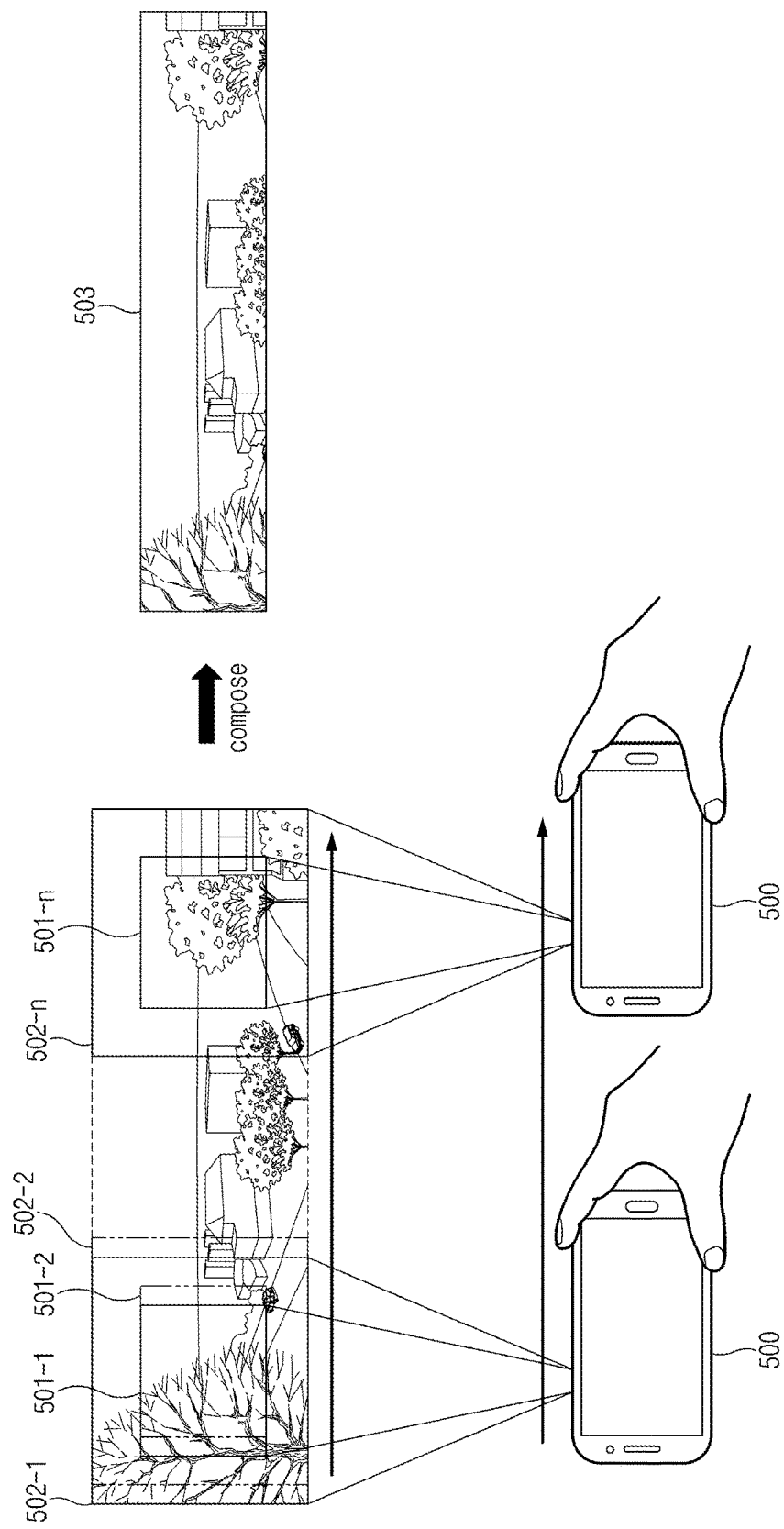
FIG. 5 is a diagram illustrating an example panorama image capturing method, according to various example embodiments of the present disclosure.

FIG. 5 is a diagram illustrating an example panorama image capturing method, according to various example embodiments of the present disclosure.

According to an embodiment, an electronic device 500 (e.g., the electronic device 400 of FIG. 4) may generate a panorama image by using a first camera (e.g., the first camera 410 of FIG. 4) and a second camera (e.g., the second camera 420 of FIG. 4). According to an embodiment, the first camera may capture a first image (e.g., 501-1) having a first FOV, and the second camera 420 may capture a second image (e.g., 502-1) having a second FOV wider than the first FOV. According to an embodiment, the first image may be included in the second image. For example, the second image may include all subjects included in the first images.

Referring to FIG. 5, the electronic device 500 may successively capture a plurality of images by using the first camera and the second camera. For example, the electronic device 500 may capture a plurality of first images 501-1 to 501-n having the first FOV by using the first camera and may capture a plurality of second images 502-1 to 502-n having the second FOV wider than the first FOV by using the second camera. For example, if a capture direction is shifted to the right from the location at which a user initially captures an image, the electronic device 500 may successively capture the plurality of first images 501-1 to 501-n and the plurality of second images 502-1 to 502-n. The term "continuous" may mean temporal continuity and may mean continuous capturing of an image at specified time intervals, for example, video shooting. The electronic device 500 may display the plurality of first images 501-1 to 501-n as a preview image in a display (e.g., the display 430 of FIG. 4). Whenever the plurality of first images 501-1 to 501-n are captured, the electronic device 500 may update and display the preview image.

According to an embodiment, the electronic device 500 may generate a third image 503 (or a panoramic image) by using at least a part of the plurality of first image 501-1 to 501-n. According to an embodiment, the electronic device 500 may compose the plurality of first images 501-1 to 501-n in a first direction (e.g., a right direction) corresponding to the moving direction of a camera according to the capturing order.

According to an embodiment, when generating the third image 503, the electronic device 500 may refer to a subject (or a feature point) included in the plurality of second images 502-1 to 502-n. For example, the electronic device may verify the subject included in the successively captured plurality of second images 502-1 to 502-n and may identify a location of the subject (or a location change) in the plurality of images. According to an embodiment, when generating the third image 503, the electronic device 500 may refer to a subject (or a feature point) included in the plurality of first images 501-1 to 501-n and the plurality of second images 502-1 to 502-n. For example, the electronic device may identify a subject included in the second image 502-1 captured at a first time point and the first image 501-2 captured at a second time point and may identify the location (or a location change) of the subject in a plurality of images.

According to an embodiment, the electronic device 500 may determine an image, which is used to generate a third image, from among the successively captured plurality of first images 501-1 to 501-n based on the location (or a location change) of the verified subject. For example, if the location of the subject included in the second image 502-2 captured at the second time point moves by the number of specified pixels or more with respect to the location of the subject included in the second image 502-1 captured at the first time point, the electronic device 500 may determine the first image 501-2 captured at the second time point as an image to be used to generate the third image. As another example, if the location of the subject included in the second image 502-2 captured at the second time point does not move by the number of specified pixels or more with respect to the location of the subject included in the second image 502-1 captured at the first time point, the electronic device 500 may compare the location of the subject included in the second image (not illustrated) captured at a third time point with the location of the subject included in the second image 502-1 captured at the first time point. If the location of the subject moves by the number of specified pixels or more, the electronic device 500 may determine the first image (not illustrated) captured at the third time point as an image to be used to generate the third image.

According to an embodiment, the electronic device 500 may determine a location of the first direction of a plurality of first images 501-1 to 501-n (or an image, which is used to generate the third image, from among the plurality of first images) in the third image 503 and a location of a second direction perpendicular to the first direction, based on a location (or a location change) of the verified subject. For example, when the electronic device 500 composes the first image 501-1 captured at the first time point and the first image 501-2 captured at the second time point, the electronic device 500 may determine a composite location of the first image 501-2 captured at the second time point with reference to a location (or a location change) of a subject included in the second image 502-1 captured at the first time point and the second image 502-2 captured at the second time point.

Referring to FIG. 5, according to an embodiment, even though there is no feature point needed to determine a composite location in the first image, the electronic device 500 may determine the first image used for composition of the third image or a composite location of the first image in consideration of locations of feature points included in the second image.

Figure 6:
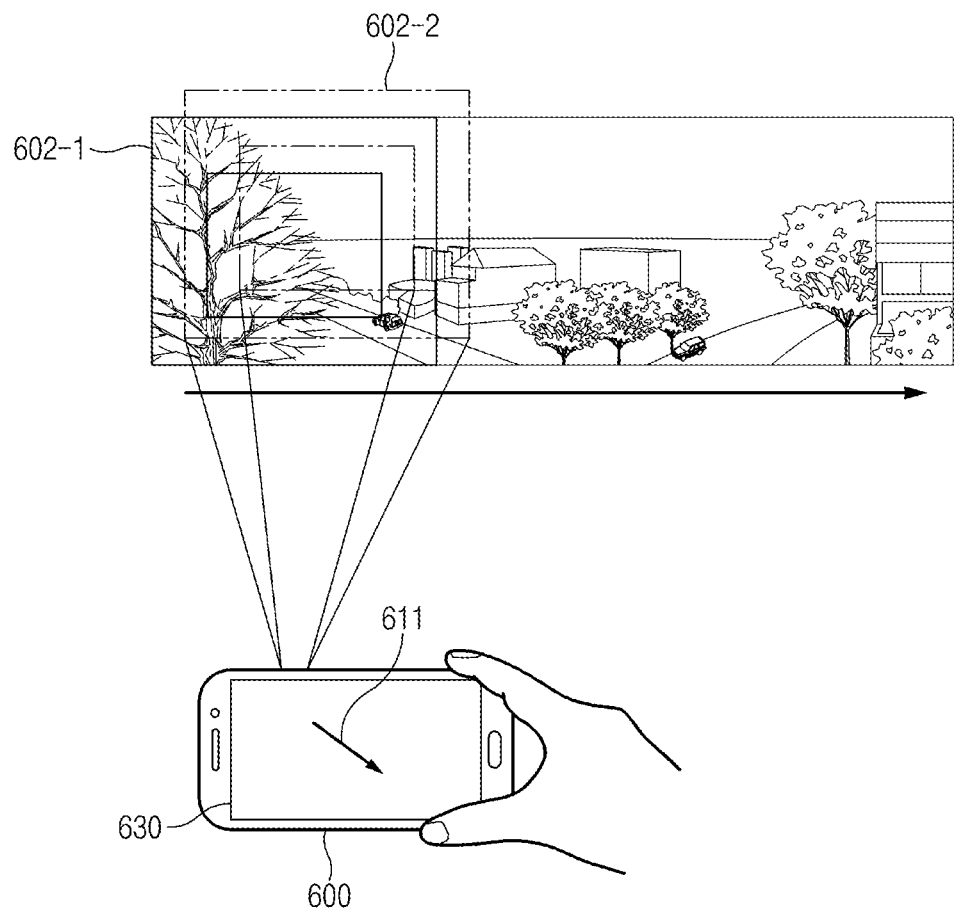
FIG. 6 is a diagram illustrating an example guide displaying method, according to various example embodiments of the present disclosure.

FIG. 6 is a diagram illustrating an example guide displaying method, according to various example embodiments of the present disclosure.

According to an embodiment, when capturing a panorama image, an electronic device 600 (e.g., the electronic device 400 of FIG. 4) may display a guide 611 for guiding a capture direction in a display 630 (e.g., the display 430 of FIG. 4). A user may maintain the capture direction in a specific direction (e.g., a right direction) with reference to the guide 611 displayed in a display. According to an embodiment, the electronic device 600 may display a symbol of another shape in addition to a directional symbol as a guide. According to an embodiment, the electronic device 600 may display the guide of an icon or a text shape. According to an embodiment, the electronic device 600 may display a third image as the guide. For example, whenever a first image is captured, the electronic device 600 may generate the third image in real time and may display the generate third image in the display 630. The user may identify the location of the first image added to the third image and may adjust a capture direction.

According to an embodiment, when displaying the guide 611 in the display, the electronic device 600 may refer to a subject (or a feature point) included in a second image 602-1 and 602-2 having a wide FOV. For example, the electronic device 600 may compare a location of a subject included in the second image 502-1 captured at a first time point with a location of a subject included in the second image 502-2 captured at a second time point and may identify a moving direction of the capture direction. As illustrated in FIG. 6, in the case where the capture direction is shifted in an upper right direction while capturing a panorama image in a right direction, the electronic device 600 may display the guide 611 for guiding the capture direction in a down right direction in the display 630.

According to an embodiment described with reference to FIG. 6, even though there is no feature point needed to identify a capture direction in the first image having a narrow FOV, the electronic device 600 may display the guide 611 in the display 630 in consideration of locations of feature points included in the second image having a wide FOV.

Figure 7:
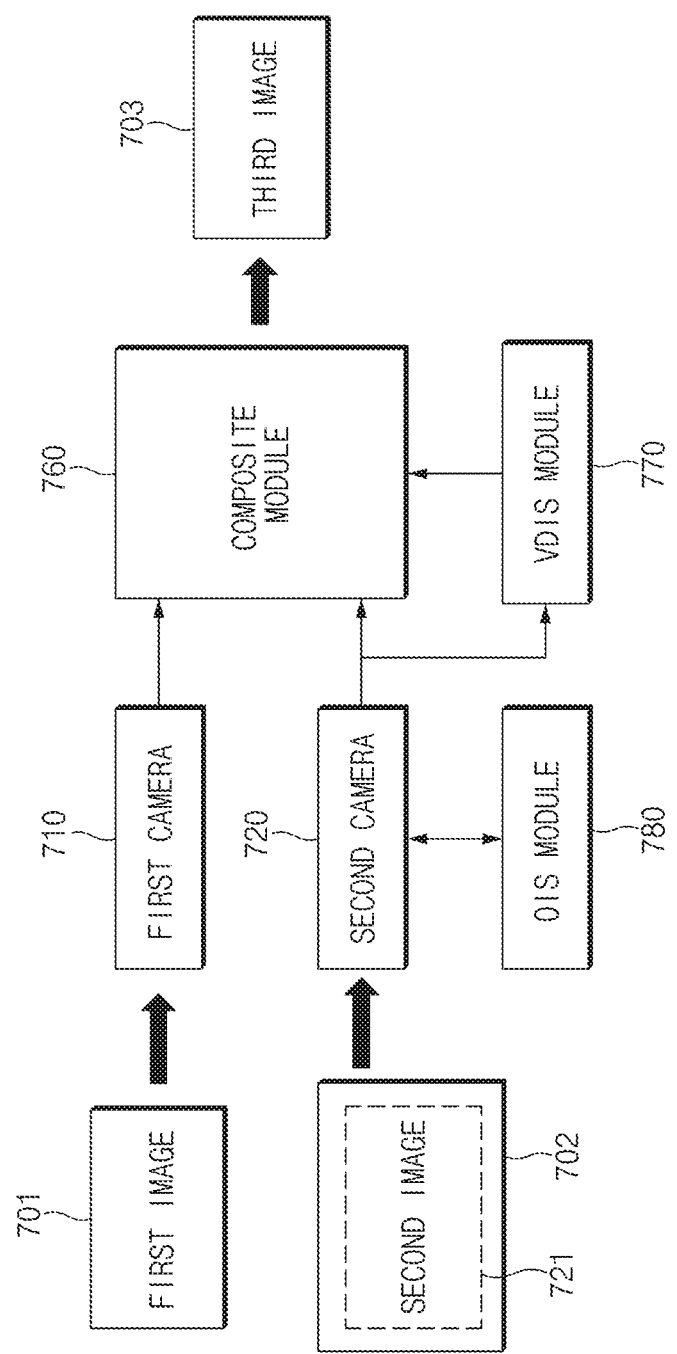
FIG. 7 is a block diagram illustrating an example configuration of an electronic device, according to various example embodiments of the present disclosure.

FIG. 7 is a block diagram illustrating an example configuration of an electronic device, according to various example embodiments of the present disclosure.

Referring to FIG. 7, an electronic device 700 (e.g., the electronic device 400 of FIG. 4) may include a first camera 710 (e.g., the first camera 410 of FIG. 4), a second camera 720 (e.g., the second camera 720 of FIG. 4), a composite module (e.g. including processing circuitry) 760 (e.g., the processor 460 of FIG. 4), a video digital image stabilization (VDIS) module (e.g., including image stabilization circuitry and/or program elements) 770, and an optical image stabilization (OIS) module (e.g., including OIC circuitry and/or program elements) 780.

The first camera 710 may be a black-white camera having a first FOV, and the second camera 720 may be a color camera having a second FOV wider than the first FOV. The first camera 710 may capture a gray scale image (a first image 701) having the first FOV, and the second camera 720 may capture a color image (a second image 702) having the second FOV. According to an embodiment, the first image may be included in the second image. For example, the second image may include all subjects included in the first images.

The composite module 760 may generate a color image (a third image 703) having the first FOV by composing the first image 701 captured by the first camera 710 and the second image 702 captured by the second camera 720. For example, the composite module 760 may generate the third image 703 by overlaying color information included in an area 721, which corresponds to the first image 701, in the second image 702 on the first image 701 of a gray scale.

According to an embodiment, the composite module 760 may include various processing circuitry and/or program elements and be implemented with a software module and/or a hardware module that composes images. In the case where the composite module 760 is implemented with the hardware module, the composite module 760 may be a separate element that is independent of a processor (e.g., the processor 460 of FIG. 4) included in the electronic device 700 or may be a part of an element included in the processor.

According to an embodiment, the VDIS module 770 may include various circuitry and/or program elements that perform video digital image stabilization (first image stabilization) on the third image 703 generated by the composite module 760. According to an embodiment, the VDIS module 770 may be activated or deactivated according to an image capture condition. For example, when capturing a video or capturing a time-lapse image, the VDIS module 770 may be activated. As another example, in the case where the first camera 710 is zoomed-in over a specified magnification (e.g., 1.1 times), the VDIS module 770 may be activated.

According to an embodiment, when performing video digital image stabilization on the third image 703, the VDIS module 770 may perform image stabilization by using the second image 702 captured by the second camera 720. The composite module 760 may generate a third image corresponding to a first time point by using a first image captured at the first time point and a second image captured at the first time point and may generate the third image corresponding to a second time point by using the first image captured at the second time point and the second image captured at the second time point. The VDIS module 770 may analyze movement of a pixel by comparing the second image captured at the first time point with the second image captured at the second time point and may calculate a correction value based on the movement of the pixel. The VDIS module 770 may perform the image stabilization by changing (e.g., to be opposed to the movements of the pixels) locations of pixels included in the third image 703 generated at the second time point based on the correction value.

The VIDS module 770 may perform the video digital image stabilization based on the second image 702 having a FOV wider than the third image 703 (i.e., including a lot of pieces of pixel information), thereby improving the accuracy of the image stabilization.

According to an embodiment, the OIS module 780 may include OIS circuitry and/or program elements that perform optical image stabilization (second image stabilization) on the second camera 720. For example, and without limitation, the OIS module 780 may include a gyro sensor. The OIS module 780 may sense the movement of the electronic device 700 or the second camera 720 by using the gyro sensor and may calculate a correction value based on information about the movement. The OIS module 780 may perform the image stabilization by changing a location of a lens included in the second camera 720 based on the correction value (e.g., to be opposed to the movement of the second camera 720). In FIG. 7, it is illustrated that the OIS module 780 is positioned outside the second camera 720. However, the OIS module 780 may be included in the second camera 720.

Due to the presence of a color filter, an amount of light absorbed by the image sensor in a color camera may be relatively small, compared to a black-white camera. To capture an image of the same brightness, the capturing time (or shutter speed) of the color camera needs to be longer than that of the black-white camera, and the color camera may have a large influence on the handshake compared to the black-white camera. As such, as illustrated in FIG. 7, in the case where the electronic device 700 includes only one OIS module 780, the image stabilization may be performed on the second camera 720 being the color camera.

In an embodiment described with reference to FIG. 7, it is described that the electronic device 700 includes one OIS module 780. However, the electronic device 700 may include a plurality of the OIS modules 780 that perform the image stabilization of each of the first camera 710 and the second camera 720.

Figure 8:
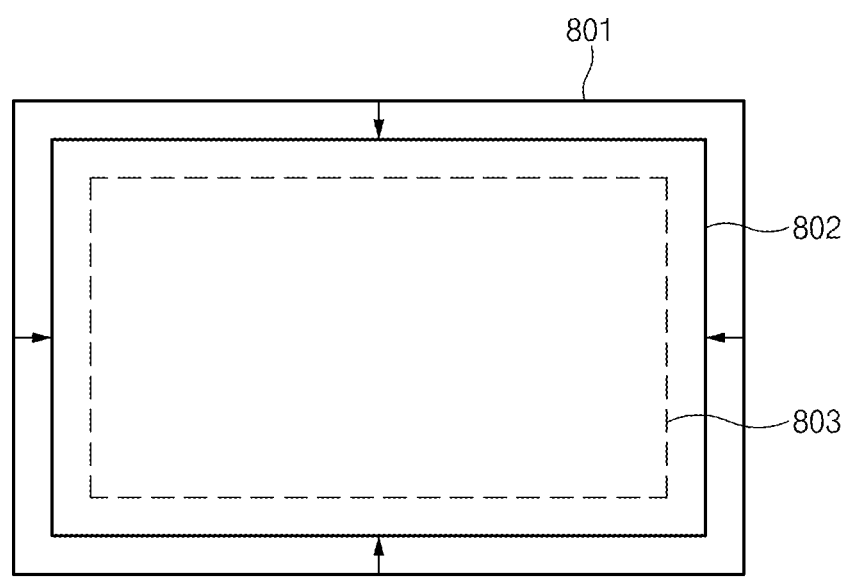
FIG. 8 is a diagram illustrating an example FOV of a composite image, according to various example embodiments of the present disclosure.

FIG. 8 is a diagram illustrating an example FOV of a composite image, according to various example embodiments of the present disclosure.

In the case where a VDIS module (e.g., the VDIS module 770 of FIG. 7) is activated and video digital image stabilization is performed, a FOV (or a size) of an image may decreases according to a location change of an image due to a handshake. For example, referring to FIG. 8, in the case where a composite module (e.g., the composite module 760 of FIG. 7) is deactivated, a third image 801 having a first FOV may be generated. In the case where the VDIS module is activated, a third image 802 having a second FOV narrower than the first FOV may be generated.

In the case where the first camera (e.g., the first camera 710 of FIG. 7) is zoomed-in over a specified magnification (e.g., 1.1 times), the VDIS module is activated to prevent the loss of the FOV (or the size) of an image due to the video digital image stabilization. In addition, in the case where the first camera is not zoomed-in or in the case where the first camera is zoomed-in below the specified magnification, the VDIS module is deactivated to prevent and/or reduce the loss of the FOV (or the size) of an image due to the video digital image stabilization. In the case where the first camera is zoomed-in over a specified magnification, a third image 803 having the third FOV narrower than the second FOV may be composed regardless of whether the VDIS module is activated. That is, since the area for changing the location of the image is secured according to zoom-in in the case where the first camera is zoomed-in over the specified magnification, the FOV (or the size) of the composed image is not affected by whether the VDIS module is activated.

According to an embodiment, an electronic device (e.g., the electronic device 400 of FIG. 4) may differently set configuration values (or capture conditions) of a first camera (e.g., the first camera 410 of FIG. 4) and a second camera (e.g., the second camera 420 of FIG. 4) and may generate a composite image by using the plurality of images captured according to the different configuration values. The composite image may be displayed as a preview-image in a display (e.g., the display 430 of FIG. 4) or may be stored as an image file in a memory (e.g., the memory 450 of FIG. 4).

According to an embodiment, the electronic device may obtain the preliminary image by using at least one of the first camera and the second camera. For example, the electronic device may capture the preliminary image by using the first camera or the second camera or may obtain the preliminary image by composing a plurality of images captured by the first camera and the second camera. For example, the preliminary image obtained by the electronic device may be a preview-image. According to an embodiment, the electronic device may determine a first area and a second area in the obtained image. Each of the first area and the second area may be an area including at least one pixel included in the obtained image. For example, the electronic device may identify an attribute value for each pixel included in the obtained image and may determine the first area and the second area based on the attribute value. For example, the attribute value of an image may include at least one of brightness, color temperature, a distance from the subject, and a movement speed of the subject. According to an embodiment, an area, of which the attribute value is the highest (or an area of which the attribute value is the lowest), in an area included in the preliminary image may be set to the first area, and an area, of which the attribute value is the lowest (or an area of which the attribute value is the highest), in an area included in the preliminary image may be set to the second area.

According to an embodiment, the electronic device may differently set a configuration value (or a capture condition) of the first camera and the second camera based on the attribute value of the first area and the attribute value of the second area. For example, if the first area and the second area are determined, the electronic device may identify (or compare) the attribute value of the first area and the attribute value of the second area. The attribute values of the first area and the second area may be a representative value (e.g., an average value, a maximum value, or a minimum value) of the attribute value of each pixel included in the first area and the second area. If a difference between the attribute value of the first area and the attribute value of the second area is not less than a specified value, the electronic device may set the configuration value of the first camera to a first configuration value corresponding to the attribute value of the first area and may set the configuration value of the second camera to a second configuration value corresponding to the attribute value of the second area. For example, the configuration value of a camera may include at least one of an exposure value, a color temperature value, a focus location, or a shutter speed value.

The electronic device may capture a first image based on the first configuration value by using the first camera and may capture a second image based on the second configuration value by using the second camera. The electronic device may compose the first image captured according to the first configuration value and the second image captured according to the second configuration value. For example, the composed image (or the third image) may be displayed as a preview-image in a display (e.g., the display 430 of FIG. 4) or may be stored as an image file in a memory (e.g., the memory 450 of FIG. 4).

Below, a method of composing a plurality of images captured according to the different configuration values will be described with reference to FIGS. 9 to 11.

Figure 9:
FIG. 9 is a diagram illustrating an example image capturing method, according to various example embodiments of the present disclosure.
Figure 9:
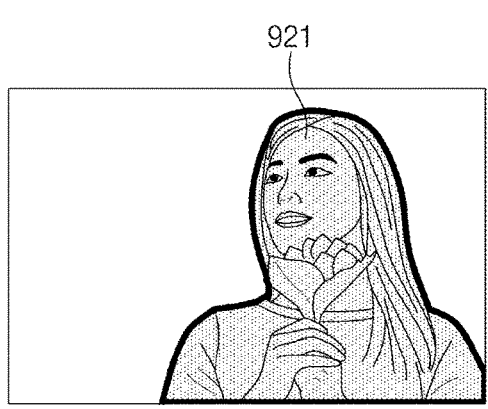
Figure 9:
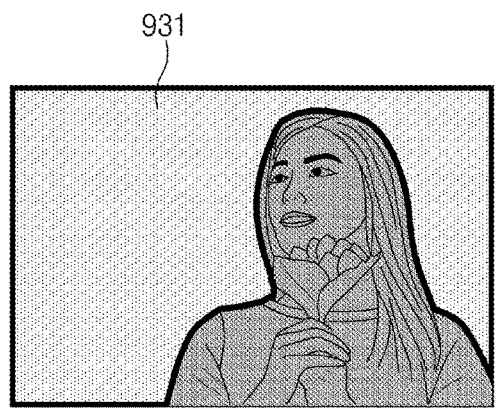
Figure 9:
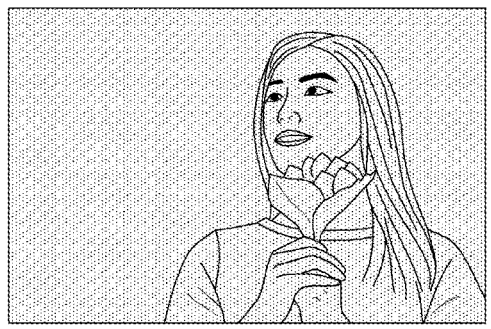

FIG. 9 is a diagram illustrating an example image capturing method, according to various example embodiments of the present disclosure.

An image 910 of FIG. 9 illustrates a preliminary image obtained by using at least one of a first camera (e.g., the first camera 410 of FIG. 4) and a second camera (e.g., the second camera 420 of FIG. 4). An electronic device (e.g., the electronic device 400 of FIG. 4) may determine a first area 911 and a second area 913 in the image 910. For example, the electronic device may identify the brightness value (or a color temperature value) of the pixels included in the image 910, may set the darkest area to the first area 911, and may determine the brightest area as the second area 913.

If a difference between the brightness value of the first area 911 and the brightness value of the second area 913 is not less than a specified value, the electronic device may differently set exposure values (or color temperature values) of the first camera and the second camera. The electronic device may set an exposure value (e.g., an aperture value and a shutter speed value) of the first camera based on the brightness value of the first area 911 and may set an exposure value of the second camera based on the brightness value of the second area 913. For example, the electronic device may set the exposure value of the first camera to be bright (e.g., the aperture value is low and the shutter speed is slow) in response to the first area 911 including the dark area, and may set the exposure value of the second camera to be dark (e.g., the aperture value is high and the shutter speed is fast) in response to the second area 913 including the bright area.

The electronic device may capture an image based on an exposure value set to each of the first camera and the second camera. An image 920 of FIG. 9 illustrates the first image captured by the first camera after the exposure value is set, and an image 930 of FIG. 9 illustrates the second image captured by the second camera after the exposure value is set.

The electronic device may generate a composite image by using the first image captured by the first camera and the second image captured by the second camera. An image 940 of FIG. 9 illustrates an image (or the third image) obtained by composing the image 920 captured by the first camera and the image 930 captured by the second camera. For example, the electronic device may generate the image 940 by using a third area 921, which includes the first area 911 of the image 910, in the image 920 and a fourth area 931, which includes the second area 913 of the image 910, in the image 930.

The electronic device may determine the third area 921 and the fourth area 931 by analyzing attributes of the image 920 and the image 930. For example, the electronic device may determine the third area 921 and the fourth area 931 based on variations of brightness values of pixels included in the image 920 and the image 930.

The quality of the image may be improved because an area including a person image relatively darkly captured in the image 910 is brightly captured in the image 940 if the image 910 is compared with the image 940.

Figure 10:
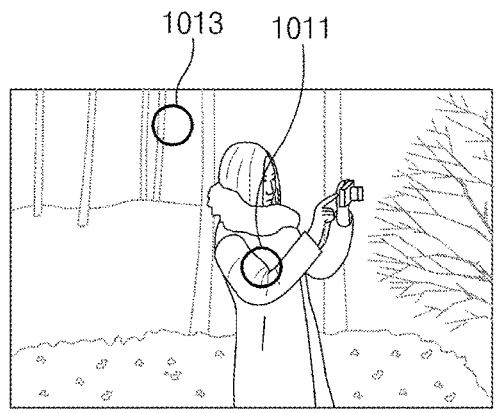
FIG. 10 is a diagram illustrating an example image capturing method, according to various example embodiments of the present disclosure.
Figure 10:
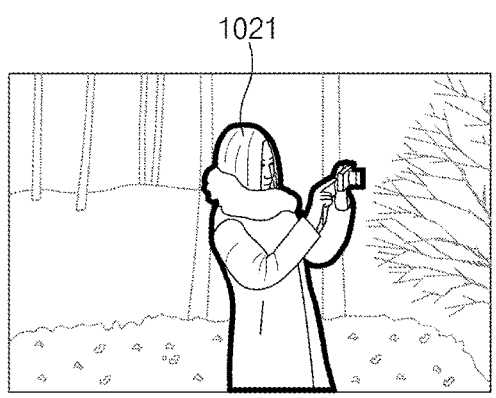
Figure 10:
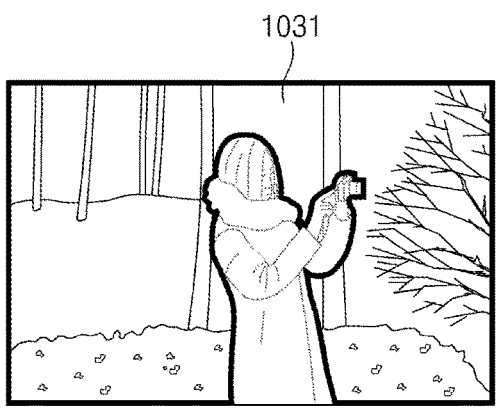
Figure 10:
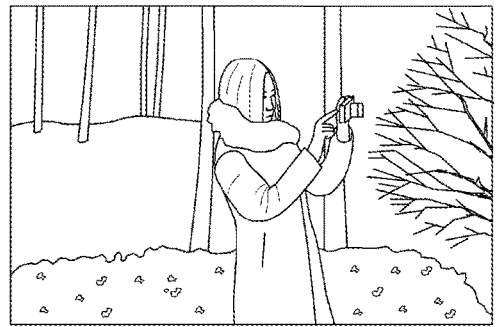

FIG. 10 is a diagram illustrating an example image capturing method, according to various example embodiments of the present disclosure.

An image 1010 of FIG. 10 illustrates a preliminary image obtained by using at least one of a first camera (e.g., the first camera 410 of FIG. 4) and a second camera (e.g., the second camera 420 of FIG. 4). An electronic device (e.g., the electronic device 400 of FIG. 4) may determine a first area 1011 and a second area 1013 in the image 1010. For example, the electronic device may identify distances from subjects of included in the image 1010, may set the closest area to the first area 1011, and may determine the farthest area as the second area 1013.

If a difference between the distance from the first area 1011 and the distance from the second area 1013 is not less than a specified value, the electronic device may differently set focus locations of the first camera and the second camera. For example, the electronic device may set the focus location of the first camera to the first area 1011 and may set the focus location of the second camera to the second area 1013.

The electronic device may capture an image based on the focus location set to each of the first camera and the second camera. An image 1020 of FIG. 10 illustrates the first image captured by the first camera after the focus location is set, and an image 1030 of FIG. 10 illustrates the second image captured by the second camera after the focus location is set. Referring to the image 1020, relatively close subjects may be clearly captured because it is in focus. On the other hand, relatively far subjects may be blurrily captured because it is out of focus. Referring to the image 1030, the relatively close subjects may be blurrily captured because it is out of focus. On the other hand, the relatively far subjects may be clearly captured because it is in focus.

The electronic device may generate a composite image (or a third image) by using the first image captured by the first camera and the second image captured by the second camera. An image 1040 of FIG. 10 illustrates an image obtained by composing the image 1020 captured by the first camera and the image 1030 captured by the second camera. For example, the electronic device may generate an image 1040 by using a third area 1021, which includes the first area 1011 of the image 1010, in the image 1020 and a fourth area 1031, which includes the second area 1013 of the image 1010, in the image 1030.

The electronic device may determine the third area 1021 and the fourth area 1031 by analyzing attributes of the image 1020 and the image 1030. For example, the electronic device may determine the third area 1021 and the fourth area 1031 based on distances from subjects included in the image 1020 and the image 1030.

If the image 1010 is compared with the image 1040, the background area that is relatively blurrily captured in the image 1010 may be captured as a clear area in the 1040 image. For this reason, an image that is in focus entirely is obtained. As a result, the quality of the image may be improved.

Figure 11:
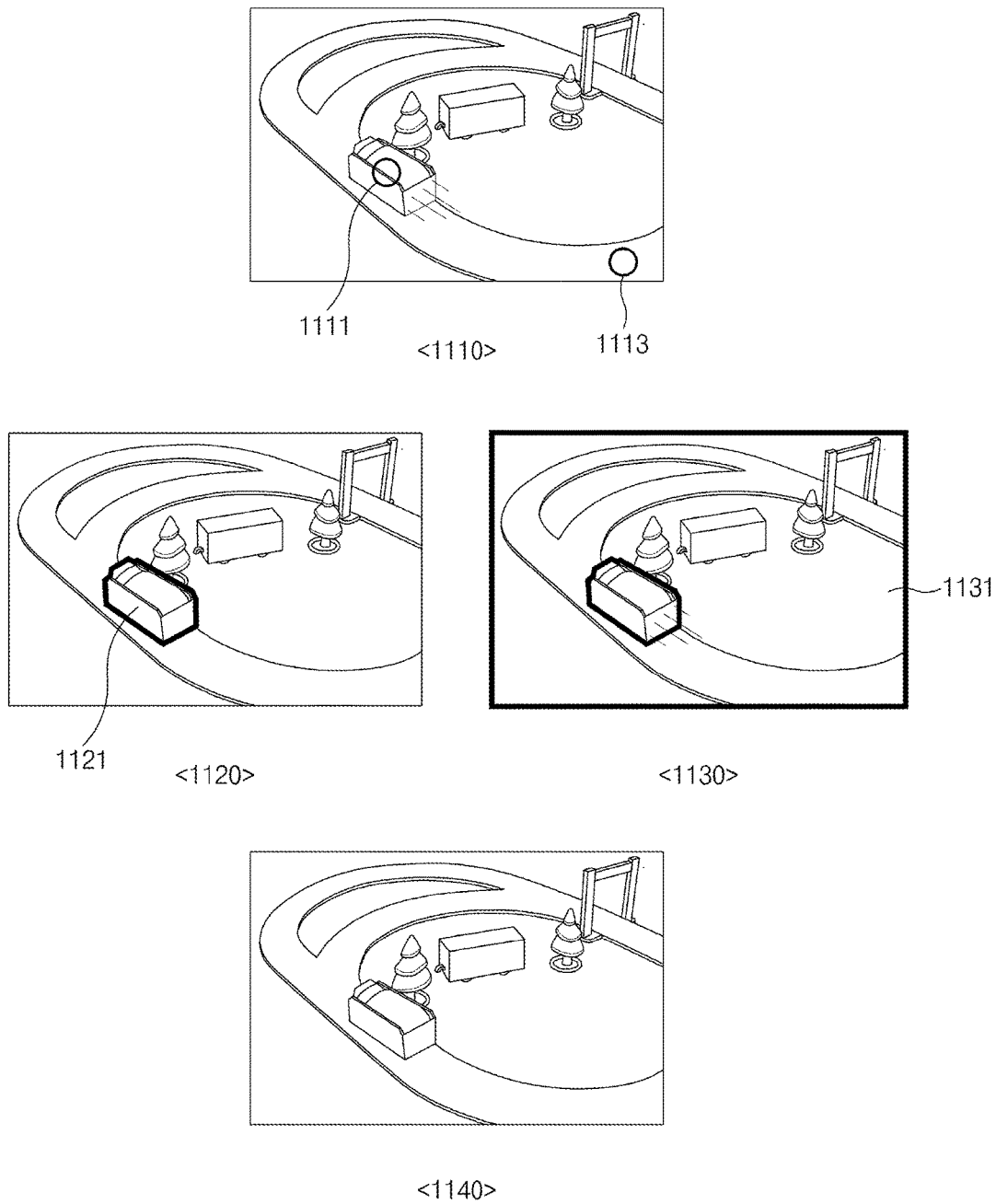
FIG. 11 is a diagram illustrating an example image capturing method, according to various example embodiments of the present disclosure.

FIG. 11 is a diagram illustrating an example image capturing method, according to various example embodiments of the present disclosure.

An image 1110 of FIG. 11 illustrates a preliminary image obtained by using at least one of a first camera (e.g., the first camera 410 of FIG. 4) and a second camera (e.g., the second camera 420 of FIG. 4). An electronic device (e.g., the electronic device 400 of FIG. 4) may determine a first area 1111 and a second area 1113 in the image 1110. For example, the electronic device may identify movement speeds of subjects included in the image 1110, may set an area, in which a subject is the fastest, to the first area 1111, and may set an area, in which a subject is the slowest or in which there is no movement of the subject, to the second area 1113. For example, the movement speeds of subjects may be verified by comparing locations of the subjects included in the successively captured image. For example, the successively captured image may be a preview-image displayed in a display (e.g., the display 430 of FIG. 4).

If a difference between a speed of the subject included in the first area 1111 and a speed of the subject included in the second area 1113 is not less than a specified value, the electronic device may differently set shutter speeds of the first camera and the second camera. The electronic device may set the shutter speed of the first camera to be (relatively) fast based on the speed of the subject included in the first area 1111 and may set the shutter speed of the second camera to be (relatively) slow based on the speed of the subject included in the second area 1113. According to an embodiment, the electronic device may set the sensitivity or the aperture value of each of the first camera and the second camera based on the shutter speed set such that images captured by the first camera and the second camera have brightness the same as or similar to each other. For example, in the case where the shutter speed of the first camera is relatively high and the shutter speed of the second camera is relatively low, the electronic device may set the sensitivity of the first camera to be high or may set the aperture value thereof to be low. Alternatively, in the case where the shutter speed of the first camera is relatively high and the shutter speed of the second camera is relatively low, the electronic device may set the sensitivity of the second camera to be low or may set the aperture value thereof to be high.

The electronic device may capture an image based on the shutter speed set to each of the first camera and the second camera. An image 1120 of FIG. 11 illustrates the first image captured by the first camera after the shutter speed is set, and an image 1130 of FIG. 11 illustrates the second image captured by the second camera after the shutter speed is set. There is no shake of subjects if referring to the image 1120 captured at a high shutter speed. If referring to the image 1130 captured at a low shutter speed, an image may be captured while a subject in the image shakes according to the speed of the subject.

The electronic device may generate a composite image (or a third image) by using the first image captured by the first camera and the second image captured by the second camera. An image 1140 of FIG. 11 illustrates an image obtained by composing the image 1120 captured by the first camera and the image 1130 captured by the second camera. For example, the electronic device may generate an image 1140 by using a third area 1121, which includes the first area 1111 of the image 1110, in the image 1120 and a fourth area 1131, which includes the second area 1113 of the image 1110, in the image 1130.

The electronic device may determine the third area 1121 and the fourth area 1131 by analyzing attributes of the image 1120 and the image 1130. For example, the electronic device may determine the third area 1121 and the fourth area 1131 based on the speeds of subjects included in the image 1120 and the image 1130.

If the image 1110 is compared with the image 1140, the subject captured while relatively shaking in the image 1110 may be clearly captured in the image 1140 without the shake. As a result, the quality of the image may be improved.

Figure 12:
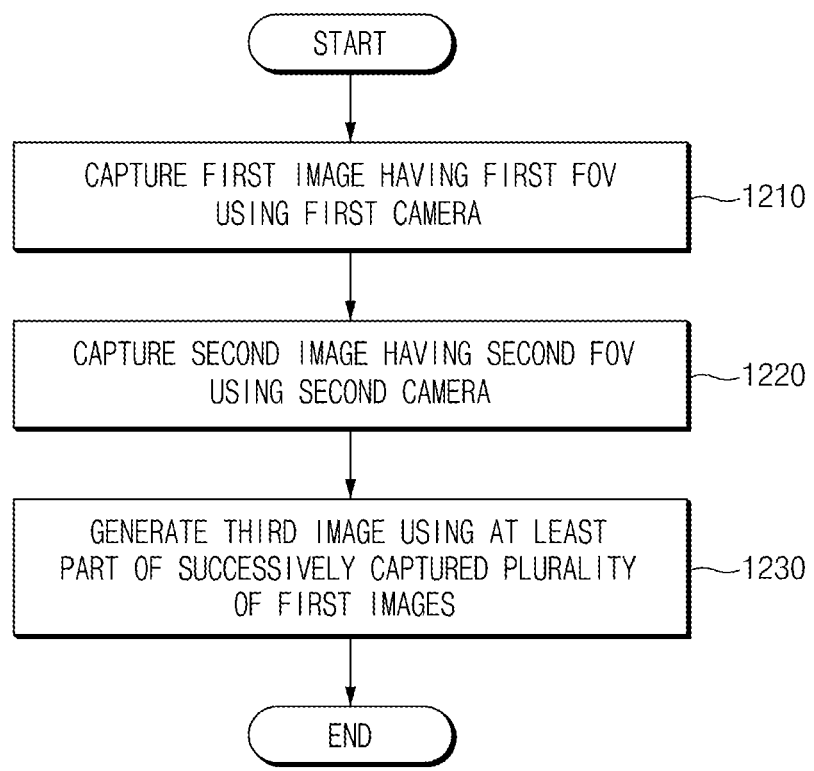
FIG. 12 is a flowchart illustrating an example image capturing method of an electronic device, according to various example embodiments of the present disclosure.

FIG. 12 is a flowchart illustrating an example image capturing method of an electronic device, according to various example embodiments of the present disclosure.

The flowchart illustrated in FIG. 12 may include operations which the electronic device processes. Even though omitted below, detailed descriptions about the electronic device described with reference to FIGS. 1 to 11 may be applied to the flowchart shown in FIG. 12.

According to an embodiment, in operation 1210, the electronic device (e.g., the electronic device 400 of FIG. 4) may capture a first image having a first FOV by using a first camera (e.g., the first camera 410 of FIG. 4). According to an embodiment, the electronic device may successively capture a plurality of first images.

According to an embodiment, in operation 1220, the electronic device may capture a second image having a second FOV wider than the first FOV by using a second camera (e.g., the second camera 420 of FIG. 4). According to an embodiment, the first image may be included in the second image. For example, the second image may include all subjects included in the first images. According to an embodiment, the electronic device may successively capture a plurality of second images. Operation 1220 capturing the second images may be executed concurrently with operation 1210 capturing the first images.

According to an embodiment, in operation 1230, the electronic device may generate a third image using at least a part of the successively captured plurality of first images. According to an embodiment, the electronic device may compose a plurality of first images in a first direction corresponding to a movement direction of a camera based on a capture order. For example, the third image may be a panorama image.

According to an embodiment, when generating the third image, the electronic device may refer to a subject (or a feature point) included in a second image. For example, the electronic device may identify a subject (or a feature point) included in the successively captured plurality of second images and may identify a location change of the subject in the images. The electronic device may determine a location of a first direction of the plurality of first images in the third image and a location of a second direction perpendicular to the first direction with reference to the subject included in the plurality of second images.

According to an embodiment, when capturing (or generating) the third image, the electronic device may display a guide for guiding a capture direction in a display (e.g., the display 430 of FIG. 4). According to an embodiment, the electronic device may display a guide in a display with reference to a subject (or a feature point) included in the plurality of second images. For example, the electronic device may identify a movement direction of a capture direction by comparing locations of the subjects included in the plurality of second images, and the electronic device may display the guide based on the movement direction of the capture direction.

According to an embodiment, the electronic device may determine the operation attribute of the first camera based on the second image captured by the second camera. For example, the operation attribute may include at least one of an exposure value, a color temperature value, and a shutter speed value. For example, the electronic device may perform photometry by using an image, which is captured by the second camera, having the second FOV and may determine the exposure value of the first camera based on the photometry result.

Figure 13:
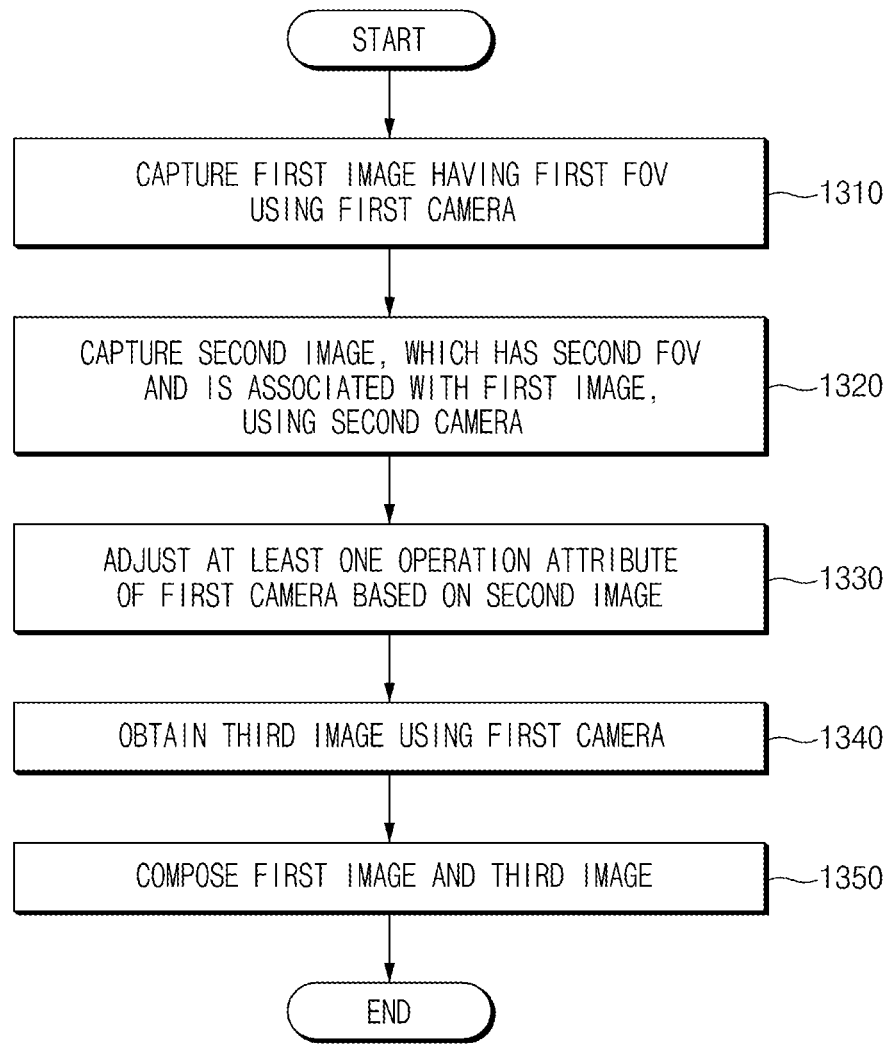
FIG. 13 is a flowchart illustrating an example image capturing method of an electronic device, according to various example embodiments of the present disclosure.

FIG. 13 is a flowchart illustrating an example image capturing method of an electronic device, according to various example embodiments of the present disclosure.

The flowchart illustrated in FIG. 13 may include operations which the electronic device processes. Even though omitted below, detailed descriptions about the electronic device described with reference to FIGS. 1 to 11 may be applied to the flowchart shown in FIG. 13.

According to an embodiment, in operation 1310, the electronic device (e.g., the electronic device 400 of FIG. 4) may capture a first image having a first FOV using a first camera (e.g., the first camera 410 of FIG. 4). For example, the first image may be a gray scale image.

According to an embodiment, in operation 1320, the electronic device may capture a second image having a second FOV wider than the first FOV using a second camera (e.g., the second camera 420 of FIG. 4). For example, the second image may be a color image. According to an embodiment, the first image may be included in the second image. For example, the second image may include all subjects included in the first images.

According to an embodiment, in operation 1330, the electronic device may adjust the operation attribute of the first camera. The electronic device may adjust the operation attribute of the first camera based on the second image captured by the second camera. For example, the operation attribute may include at least one of an exposure value, a color temperature value, and a shutter speed value. For example, the electronic device may perform photometry using an image, which is captured by the second camera, having the second FOV and may determine the exposure value of the first camera based on the photometry result.

According to an embodiment, in operation 1340, the electronic device may obtain a third image using the first camera. The electronic device may obtain the third image based on the operation attribute of the first camera adjusted in operation 1330.

According to an embodiment, in operation 1350, the electronic device may compose the first image and the third image. According to an embodiment, the electronic device may compose the first image and the third image based on the second image and the third image. For example, the electronic device may identify an identical-image area (e.g., an area including the same subject) in the second image and the third image and may compose the first image and the third image based on the verified identical-image area.

According to an embodiment, the electronic device may obtain a fourth image associated with the third image by using the second camera and may compose the first image and the third image based on the second image and the fourth image. For example, the electronic device may identify an identical-image area in the second image and the fourth image and may compose the first image and the third image based on the verified identical-image area.

Figure 14:
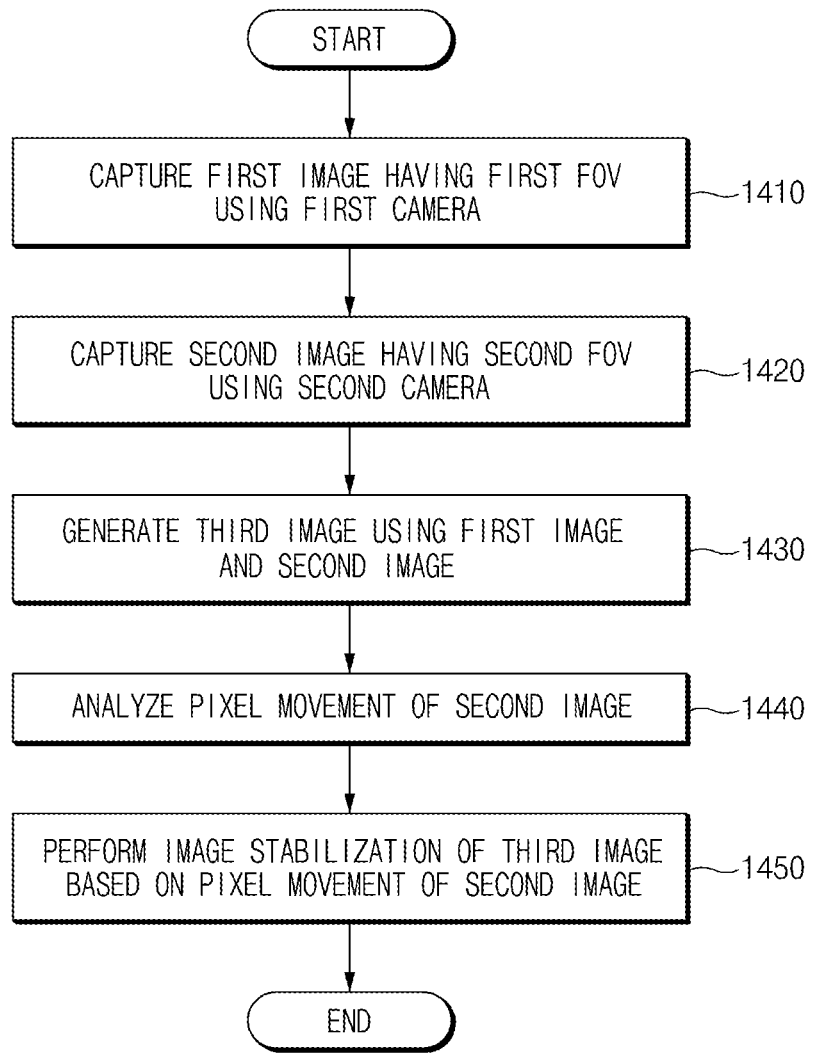
FIG. 14 is a flowchart illustrating an example image capturing method of an electronic device, according to various example embodiments of the present disclosure.

FIG. 14 is a flowchart illustrating an example image capturing method of an electronic device, according to various example embodiments of the present disclosure.

The flowchart illustrated in FIG. 14 may include operations which the electronic device processes. Even though omitted below, detailed descriptions about the electronic device described with reference to FIGS. 1 to 11 may be applied to the flowchart shown in FIG. 14.

According to an embodiment, in operation 1410, the electronic device (e.g., the electronic device 400 of FIG. 4) may capture a first image having a first FOV using a first camera (e.g., the first camera 410 of FIG. 4). For example, the first image may be a gray scale image.

According to an embodiment, in operation 1420, the electronic device may capture a second image having a second FOV wider than the first FOV using a second camera (e.g., the second camera 420 of FIG. 4). For example, the second image may be a color image. According to an embodiment, the first image may be included in the second image. For example, the second image may include all subjects included in the first images.

According to an embodiment, in operation 1430, the electronic device may generate a third image using the first image and the second image. For example, the electronic device may generate the third image by overlaying color information included in an area, which corresponds to the first image, in the second image on the first image of a gray scale.

According to an embodiment, in operation 1440, the electronic device may analyze the pixel movement of the second image. For example, the electronic device may analyze pixel movement by comparing the successively captured plurality of second images.

According to an embodiment, in operation 1450, the electronic device may perform image stabilization on the third image based on the pixel movement of the second image. According to an embodiment, the electronic device may perform video digital image stabilization on the third image based on the pixel movement of the second image. For example, the electronic device may calculate a correction value based on the pixel movement of the second image and may perform image stabilization by changing locations of pixels included in the third image (e.g., to be opposed to the movement of the pixel) based on the correction value.

According to an embodiment, the electronic device may activate or deactivate a DVIS function based on an image capture condition. For example, when capturing a video or capturing a time-lapse image, the electronic device may be activated. As another example, in the case where the first camera is zoomed-in over a specified magnification (e.g., 1.1 times), the electronic device may be activated.

Figure 15:
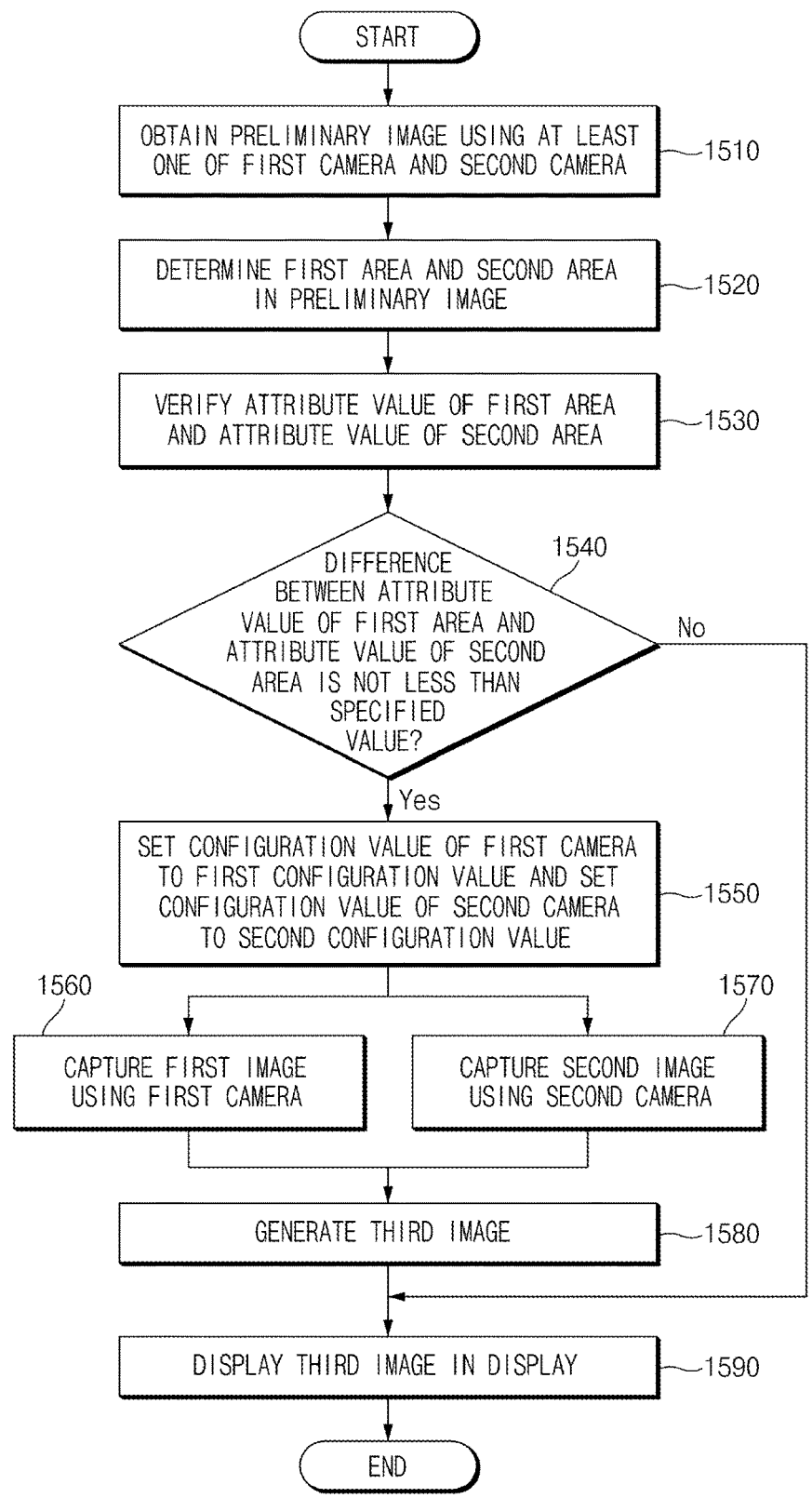
FIG. 15 is a flowchart illustrating an example image capturing method of an electronic device, according to various example embodiments of the present disclosure.

FIG. 15 is a flowchart illustrating an example image capturing method of an electronic device, according to various example embodiments of the present disclosure.

The flowchart illustrated in FIG. 15 may include operations which the electronic device processes. Even though omitted below, detailed descriptions about the electronic device described with reference to FIGS. 1 to 11 may be applied to the flowchart shown in FIG. 15.

According to an embodiment, in operation 1510, the electronic device (e.g., the electronic device 400 of FIG. 4) may obtain a preliminary image using at least one of a first camera (e.g., the first camera 410 of FIG. 4) and a second camera (e.g., the second camera 420 of FIG. 4). For example, the electronic device may capture the preliminary image by using the first camera or the second camera or may obtain the preliminary image by composing a plurality of images captured by the first camera and the second camera.

According to an embodiment, in operation 1520, the electronic device may determine a first area and a second area in the preliminary image. Each of the first area and the second area may be an area including at least one pixel included in the preliminary image. For example, the electronic device may identify an attribute value for each pixel included in the preliminary image and may determine the first area and the second area based on the attribute value. For example, the attribute value of an image may include at least one of brightness, color temperature, a distance from the subject, and a movement speed of the subject. According to an embodiment, an area, of which the attribute value is the highest (or an area of which the attribute value is the lowest), in an area included in the preliminary image may be set to the first area, and an area, of which the attribute value is the lowest (or an area of which the attribute value is the highest), in an area included in the preliminary image may be set to the second area.

According to an embodiment, in operation 1530, the electronic device may identify (or compare) the attribute value of the first area and the attribute value of the second area. The attribute values of the first area and the second area may be a representative value (e.g., an average value, a maximum value, or a minimum value) of the attribute value of each pixel included in the first area and the second area.

According to an embodiment, in operation 1540, the electronic device may determine whether a difference between the attribute value of the first area and the attribute value of the second area is not less than (e.g., exceeds) a specified value.

According to an embodiment, in operation 1540, if the difference between the attribute value of the first area and the attribute value of the second area is not less than a specified value, in operation 1550, the electronic device may set the configuration value of the first camera to a first configuration value corresponding to the attribute value of the first area and may set the configuration value of the second camera to a second configuration value corresponding to the attribute value of the second area. For example, the configuration value of a camera may include at least one of an exposure value, a color temperature value, a focus location, or a shutter speed value.

According to an embodiment, in operation 1540, if it is determined that a difference between the attribute value of the first area and the attribute value of the second area is less than the specified value, in operation 1590, the electronic device may display the preliminary image in a display. According to an embodiment, the electronic device may display the preliminary image as a preview-image.

According to an embodiment, in operation 1550, if the configuration value of the first camera is set, in operation 1560, the electronic device may capture the first image using the first camera based on the first configuration value.

According to an embodiment, in operation 1550, if the configuration value of the second camera is set, in operation 1570, the electronic device may capture the second image using the second camera based on the second configuration value.

According to an embodiment, in operation 1580, the electronic device may generate the third image using the first image captured according to the first configuration value and the second image captured according to the second configuration value. For example, the electronic device may determine a third area including the first area in the first image and may determine a fourth area including the second area in the second image. The electronic device may generate the third image by using the third area and the fourth area.

According to an embodiment, in operation 1590, the electronic device may display the third image in the display. According to an embodiment, the electronic device may display the third image as a preview-image.

According to various embodiments of the present disclosure, the captured image may be improved by using a plurality of images captured by using a plurality of cameras.

The term "module" used herein may represent, for example, a unit including one or more combinations of hardware, software and firmware. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include, for example, and without limitation, at least one of a dedicated processor, a CPU, an application-specific IC (ASIC) chip, a field-programmable gate array (FPGA), and a programmable-logic device for performing some operations, which are known or will be developed.

According to various embodiments, at least a part of an apparatus (e.g., modules or functions thereof) or a method (e.g., operations) may be, for example, implemented by instructions stored in a computer-readable storage media in the form of a program module. The instruction, when executed by a processor, may cause the one or more processors to perform a function corresponding to the instruction. The computer-readable storage media, for example, may be a memory.

A computer-readable recording medium may include a hard disk, a magnetic media, a floppy disk, a magnetic media (e.g., a magnetic tape), an optical media (e.g., a compact disc read only memory (CD-ROM) and a digital versatile disc (DVD), a magneto-optical media (e.g., a floptical disk), and hardware devices (e.g., a read only memory (ROM), a random access memory (RAM), or a flash memory). Also, a program instruction may include not only a mechanical code such as things generated by a compiler but also a high-level language code executable on a computer using an interpreter. The above-mentioned hardware device may be configured to operate as one or more software modules to perform operations according to various embodiments of the present disclosure, and vice versa.

A module or a program module according to various embodiments of the present disclosure may include at least one of the above-mentioned elements, or some elements may be omitted or other additional elements may be added. Operations performed by the module, the program module or other elements according to various embodiments of the present disclosure may be performed in a sequential, parallel, iterative or heuristic way. Furthermore, some operations may be performed in another order or may be omitted, or other operations may be added.

While the present disclosure has been illustrated and described with reference to various example embodiments thereof, it will be understood by those skilled in the art that various changes in form and details may be made therein without departing from the spirit and scope of the present disclosure as defined by the appended claims and their equivalents.

What is claimed is:

1. An electronic device comprising:
   a first camera supporting a first field of view (FOV);
   a second camera supporting a second FOV, the first and second FOVs being different from each other; and
   a processor,
   wherein the processor is configured to:
      obtain a first image having the first FOV using the first camera;
      obtain a second image, which is associated with the first image and having the second FOV using the second camera;
      adjust at least one operation attribute of the first camera based on the second image;
      obtain a third image having the first FOV based on the adjusted at least one operation attribute using the first camera; and
      generate a panoramic image using at least the first image and the third image.

2. The electronic device of claim 1, wherein the second FOV is wider than the first FOV.

3. The electronic device of claim 1, wherein the processor is configured to:
   display a guide providing a capture direction for obtaining the third image.

4. The electronic device of claim 1, wherein the at least one operation attribute includes at least one of: an exposure value, a color temperature value, and a shutter speed value.

5. The electronic device of claim 1, wherein the processor is configured to:
   identify an identical-image area with respect to the second image and the third image; and
   generate a fourth image by composing the first image and the third image based on the identical-image area.

6. The electronic device of claim 1, wherein the processor is configured to:
   obtain a fourth image using the second camera;
   obtain the third image associated with the fourth image using the first camera; and
   generate a fifth image by composing the first image and the third image based on the second image and the fourth image.

7. The electronic device of claim 6, wherein the processor is configured to:
   identify an identical-image area with respect to the second image and the fourth image; and
   generate the fifth image based on the identical-image area.

* * * * *